(12) United States Patent
Strom et al.

(10) Patent No.: US 7,010,796 B1
(45) Date of Patent: Mar. 7, 2006

(54) METHODS AND APPARATUS PROVIDING REMOTE OPERATION OF AN APPLICATION PROGRAMMING INTERFACE

(75) Inventors: Daniel J. Strom, North Andover, MA (US); Ohad Zeliger, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 746 days.

(21) Appl. No.: 09/966,615

(22) Filed: Sep. 28, 2001

(51) Int. Cl.
*G06F 9/46* (2006.01)

(52) U.S. Cl. .................. 719/328; 719/310; 719/330

(58) Field of Classification Search ............... 719/330, 719/312, 310, 328; 718/104, 101; 717/126, 717/128, 136, 146; 707/103 R; 714/38
See application file for complete search history.

(56) References Cited

U.S. PATENT DOCUMENTS

| | | | | |
|---|---|---|---|---|
| 5,327,559 A | * | 7/1994 | Priven et al. | 718/101 |
| 5,905,894 A | * | 5/1999 | De Bonet | 717/146 |
| 6,151,638 A | * | 11/2000 | Hale et al. | 719/312 |
| 6,298,354 B1 | * | 10/2001 | Saulpaugh et al. | 707/103 R |
| 6,334,210 B1 | * | 12/2001 | Miura et al. | 717/128 |
| 6,502,236 B1 | * | 12/2002 | Allen et al. | 717/136 |
| 6,523,137 B1 | * | 2/2003 | Stone | 714/38 |
| 6,766,348 B1 | * | 7/2004 | Combs et al. | 718/104 |
| 2003/0033446 A1 | * | 2/2003 | Noden | 709/328 |

OTHER PUBLICATIONS

Software Technology Review; Remote Procedure Call; .sei.cmu.edu/str/descriptions/rpc_body.html; Aug. 7, 2001; 5 pages.

* cited by examiner

*Primary Examiner*—Meng-Al T. An
*Assistant Examiner*—Van Nguyen
(74) *Attorney, Agent, or Firm*—Chapin & Huang, L.L.C.; Barry W. Chapin, Esq.

(57) ABSTRACT

A system can analyze an application programming interface definition to automatically produce software string generator and parser software components allowing remote access to functions within the application programming interface definition by processes that are not natively compatible with the computing system environment in which the application programming interface operates. A first string generator processes can produce an encapsulated function call from a first process, such as a Java-based process, that calls a first function in a first computing environment. A second parser process operates in a second computing environment to receive the encapsulated function call and to invoke a second function call in a second process, such as a C-based process. Results from the second function call are returned to a second string generator which produces an encapsulated response that is returned to a first parser process. The first parser process maps the encapsulated response back into first function call parameters for return to the first process, thus providing access to second functions of the application programming interface by the first process.

24 Claims, 12 Drawing Sheets

METHODS AND APPARATUS PROVIDING REMOTE OPERATION OF AN APPLICATION PROGRAMMING INTERFACE

FIELD OF THE INVENTION

The present invention generally relates to the operation of software applications in a remote manner, and more particularly, to systems and techniques which allow for remote operation of an application programming interface.

BACKGROUND OF THE INVENTION

Many types of conventional computerized devices include hardware (i.e., circuitry and/or software) that other software applications (i.e., executing processes) or devices can access via one or more interfaces commonly referred to as application programming interfaces (APIs). As an example, a data storage system can include a collection of disk drives that may be coupled via a high-speed connection (e.g., SCSI, Fiber-Channel, or the like) to a computer system which operates as a data storage server that allows software applications to access and manage data stored within the data storage system. The server computer system may operate a data storage access software system which provides the processing logic and functionality required to access and manage the data stored within the data storage system. The data storage access software can provide a set of functions that collectively define an application programming interface. Other software applications that require access to data within the data storage system can incorporate the application programming interface into their code and can make calls to functions defined within the application programming interface. By providing such functions via an application programming interface, the low-level processing required to send, receive and/or manage data to, from, or within the data storage system is encapsulated within the data storage access software functions. Other software applications thus only need to make calls to the required functions of the application programming interface in order to include such complex processing.

A typical conventional application programming interface defines a set of functions and respective function parameters which another entity (i.e., the calling entity) such as a software process may invoke by making a call to one or more of the functions defined by or within the application programming interface. When the calling entity invokes a function call to a function defined within the application programming interface, the calling entity typically supplies any required input values for any input parameters required for that function call. When an application programming interface function call is made in this manner, the code of the function (i.e., the processing logic included within the software application which provides the application programming interface) receives any associated input parameters and processes these input parameters according to the processing logic for that function. The processing logic of the function may produce data or other information which is output or returned from the function as a series of one or more output parameters. The calling entity can access the data processed by the function by referencing the output values associated with the output parameters which it receives as a result of having invoked the function call to the application programming interface.

During the process of developing a software application, a software developer writes application code (e.g., C code) to include the aforementioned functLon calls to functions defined within an application programming interface as needed to accomplish the goals of the software application under development. As an example, if a software developer is developing a database application, the database application code may be written to include function calls to functions within an application programing interface provided by the data storage access software mentioned above to allow the database application to store and retrieve data from the data storage system during its operation or execution.

In some situations, a software application operating on a computer system might require access to a function within an application programming interface which is available (i.e., which executes) on another computer system. Conventional software mechanisms have been developed to allow a software application operating on one computer system to remotely invoke the processing functionality associated with a function of an application programming interface provided on another computer system. An example of such a conventional software package is called remote procedure call or RPC. To use RPC, a software developer includes special RPC function calls into the code of the software application that requires remote access to the application programming interface. In addition, the software developer must manually create software that operates on the remote computer system which contains the application programming interface in order to receive and process an RPC function call. In other words, the software developer must manually develop a client side piece of software which invokes RPC function calls and must also manually develop a server side piece of software to receive and process those calls in conjunction with the application programming interface.

SUMMARY OF THE INVENTION

Conventional techniques and mechanisms for accessing functions provided by an application programming interface can suffer from a variety of deficiencies. In particular, in a software application that uses RPC as a mechanism for remotely accessing functions provided by an application programming interface, both the client and server side software applications are limited to incorporating RPC function calls for only the current set of functions provided by the application programming interface. In other words, only those functions which are available at the time of development of the client and server software application are available for access by RPC. This is because the RPC code must be manually developed for each application programming interface function that is to be accessed. If additional functions are incorporated into the application programming interface at a later time after development of the client and server software application which uses RPC, those new functions will not be available for use by the client and server software applications. In order for the client and server software applications to take advantage of these new functions, the software developer must modify the RPC function call statements and software code within the client and server portions of the software. This is largely a manual effort which requires a programmer to modify and recompile the source code in order for RPC to be aware of the additional functions available for use within the application programming interface. To this end, systems such as RPC require manual generation of the functions and data structures for use in operating an application programming interface from a remote process.

In addition, native compatibility must exist between the client and server computer systems that use RPC. Generally what is meant by "native compatibility" is that variable and parameter type definitions for parameters passed between a client and server software application that use RPC function call mechanisms to remotely access functions of application programming interface must be the same format between the different operating platforms or environments in which the client and server portions of software application operate.

As an example, if the client side portion of a software application uses RPC function calls and is written in the C programming language and uses C variables and type definitions which conform to standard C language type definitions, the server side portion of the software application which receives the RPC function calls must also be written in the C programming language in order to define variables which conform to the same C language type definitions as the client side portion of the software application. Accordingly, it is inherently difficult for a client side software application written in one programming language, such as Java, to incorporate RPC function calls which are to be sent to a server side software application written in another programming language, such as the C or C++ language which uses different variable and type definitions. One reasons for this is because data structures defined in the Java programming language environment are generally incompatible in size and type with data structures defined using C or C++ language type definitions. Accordingly, conventional uses of RPC require that the client and server side portions of software be developed using the same programming language and use the same type definitions for parameters passed using RPC function calls.

The present invention provides mechanisms and techniques for accessing a second application programming interface in a second computing environment from a first process operating in a first computing environment that cannot natively access the second application programming interface. In one embodiment, the method includes the steps of detecting a first function call made by a first process in the first computing environment. Based on the first function call, the method generates an encapsulated function call for transfer from the first computing environment to the second computing environment. The encapsulated function call contains a mapping of first function call parameter values (e.g., input parameters) useable in the first computing environment to first meta parameter values, which may be strings, for example. The method then transfers the encapsulated function call containing the first meta parameter values from the first computing environment to the second computing environment.

Another method embodiment receives the encapsulated function call containing first meta parameters (the input parameters in this example) from the first computing environment. The method then parses the encapsulated function call to map the first meta parameters into second function call parameters associated with a second function definition in the second application programming interface definition. The method then invokes operation of the second function associated with the second process (i.e., using the input parameter values from the first meta parameters). In this manner, the first function can make a first function call to a "parallel" or equivalent stub function in the first computing environment which causes embodiments of the invention to invoke the string generator in the first computing environment to convert the first function call parameters into first meta parameters which are then passed, as an encapsulated function call, to a second parser process operating in the second computing environment. The second parser process receives the encapsulated function call and maps the first meta parameters into second function call parameters usable by the second function. The second parser process also then invokes the second function within the second application programming interface bypassing the second function the second function call parameters.

When the second function has completed its processing, the second string generator configured according to this embodiment of the invention receives second function call parameter values (e.g., output parameters) as output from invocation of second function. The method then maps the second function call parameters (i.e., the output parameters) into second meta parameters within an encapsulated response and transfers the encapsulated response to the first computing environment. A first parser process in the first computing environment can receive the encapsulated response and can parse the second meta parameters in this encapsulated response into first function call parameters (e.g., into output parameters that receive the output value of the second function from the second meta parameters) for return to the first process to complete the first function call.

Other embodiments of the invention relate to methods for automatically generating software components that allow or provide for operation of an application programming interface in a second computing environment from a first process in a first computing environment, in which the first process is not natively compatible with the second computing environment. One such method embodiment comprises the steps of analyzing a second application programming interface definition associated with a second computing environment to discover second function definitions in the second application programming interface definition. Based on the step of analyzing, the method automatically generates, for each second function definition discovered in the second application programming interface definition a plurality of software components.

In particular, a first string generator is generated that is capable of receiving a first function call in the first computing environment from a first process and encapsulating the first function call (e.g., input parameters from this function call) into an encapsulated function call. A second parser is generated that is capable of receiving the encapsulated function call and parsing the encapsulated function call (e.g., receive the input parameter values) to invoke a corresponding second function definition in the second application programming interface definition for operation within the second computing environment. A second string generator capable of receiving an output from the second function call (e.g., receiving output parameters) from a second process in the second computing environment and encapsulating the output (e.g., the values of the output parameters) into an encapsulated response. The method also generates a first parser capable of receiving the encapsulated response and parsing the encapsulated response to return the output (e.g., the output values of the output parameters from within the encapsulated response) to the first function in the first process operating in the first computing environment. In this manner, embodiments of the invention can analyze an application programming interface, such as a C or C++ language application programming interface definition (i.e., a C-based application programming interface), and produce software components that allow processes such as Java processes to access (e.g., invoke) functions within the C-based application programming interface.

Other embodiments of the invention include a computerized device, such as a workstation or other computer system, configured to process all of the method operations disclosed herein as embodiments of the invention. In such embodiments, the computer system includes an interface, a memory system, a processor and an interconnection mechanism connecting the interface, the processor and the memory system. In such embodiments, the memory system is encoded with one or more software applications (e.g., code) that when performed (e.g., executed) on the processor, produces software processes that cause the computer system to operate processes that can obtain access to a second application programming interface in a second computing environment from a first process operating in a first computing environment that cannot natively access the second application programming interface, and/or that can automatically generate applications allowing operation of an application programming interface in a second computing environment from a first process in a first computing environment, in which the first process is not natively compatible with the second computing environment. Such software processes can perform all of the method embodiments and operations explained herein as embodiments of the invention.

Other arrangements of embodiments of the invention that are disclosed herein include software programs to perform the method embodiment operations summarized above and disclosed in detail below. More particularly, a computer program product is disclosed which has a computer-readable medium including computer program logic encoded thereon that embodies the steps and operations explained herein as the processing of the embodiments of the invention. The computer program logic, when executed on at least one processor with a computer system, causes the processor to perform the operations (e.g., the methods, operations or steps) indicated herein as embodiments of the invention. Such arrangements of the invention are typically provided as software, code and/or other data arranged or encoded on any type of computer readable medium such as an optical medium (e.g., CD-ROM), floppy or hard disk, or other a storage medium such as firmware or microcode in one or more Read Only Memory (ROM) or Random Access Memory (RAM) or other microchips or as an Application Specific Integrated Circuit (ASIC). The software, firmware or other such configurations can be installed and operated within a computer system to cause the computer system to perform the techniques explained herein as embodiments of the invention.

It is to be understood that the system of the invention can be embodied strictly as a software program, as software and hardware, or as hardware alone (e.g., via implementation in circuitry). Example embodiments of the invention may be implemented within the EMC Control Center (ECC) software application that provides access to storage area network (SAN) managed resources in a SAN environment via an application programming interface. ECC is manufactured by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS OF THE INVENTION

Figure 1:
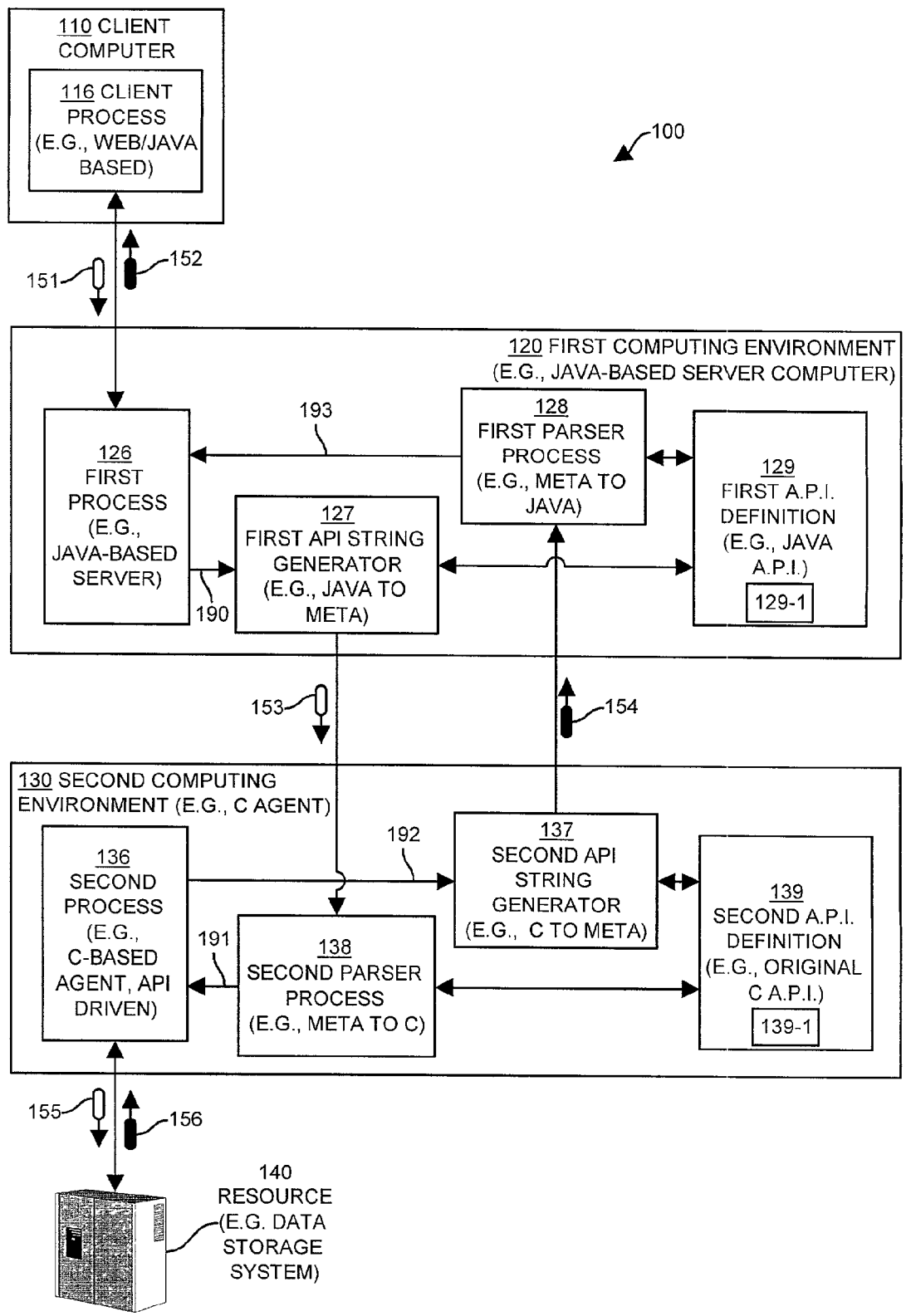
FIG. 1 illustrates a computing system environment configured according to an example embodiment of the invention to allow a first process operating in a first computing environment to the access functions within an application programming interface provided by a second process operating on in a second computing environment that is not natively compatible with the first computing environment.

Generally, the present invention provides techniques and mechanisms that allow a software application operating as a first process in a first computing system environment to access (i.e., when executing as a process) functions associated with an application programming interface which operates or is available in a second computing system environment that is not natively compatible with the first computing system environment. By way of example, consider a computing system environment having two interconnected computer systems. The first computing system can be a "server" computer which operates a Java-based server application as a first process. The second computing system may be an agent or interface computer system which operates a C-based agent application as a second process that provides an application programming interface that provides function calls accessible by other applications using C or C++ language constructs and semantics. As used herein, what is meant by a "C-based" or "C-style" environment is one that operates applications developed using the C and/or C++ programming languages. The second or agent computing system can operate, for example, as an interface to a data storage system in which case the agent or interface software provides the application programming interface to allows other applications to access data within the data storage system.

Operation of the second or agent application programming interface however requires providing C-style function calls to functions defined within the application programming interface. Using conventional application programming interface access techniques, the Java-based server process (i.e., the first process) is not be able to easily or natively formulate or make C-style function calls to the functions within the C-based application programming interface provided by the agent (i.e., second) process. However, by utilizing embodiments of the invention, the Java-based server software is capable of invoking "first" Java-based function calls to "second" C-based functions within the C-based application programming interface provided by the agent process operating on the agent computer system.

The terms "first" and "second" will be used herein to distinguish between processes and other components that exist or operate within the different computing environments, such as Java and C-based environments. It is to be understood that the system of the invention is not limited to allowing only processes in Java and C environments to interoperate in the manner explained herein. Rather, the analysis and operational techniques explained herein can be used with many different types of different environments in which an application programming interface is accessed from an environment which is not native to that application programming interface.

Generally, to achieve this operation, embodiments of the invention initially perform an analysis and preprocessing operation on an application programming interface definition that is written in accordance with a programming language, such as a C-based application programming interface, in conjunction with a language grammar describing the syntax, constructs and semantics of the programming language, such as a C language grammar, and further in conjunction with support code for grammar processing. The inputs and details related to the analysis and application programming interface processing operations will be explained in more detail later. Generally however, as a result of the analysis and preprocessing of the application programming interface definition, embodiments of the invention produce software components that include two string generator and two parser processes, one each for both the server (i.e. the first, which may be a Jva-based) and the agent (i.e., the second, which may be a C-based) computing system environments. In addition, embodiments of the invention also produce an application programming interface definition that is useable in the first (e.g., in the Java) computing system environment and that contains callable function definitions that correspond one-to-one with function definitions in the second application programming interface definition that is analyzed. Embodiments of the invention then utilize the string generator and parser processes at runtime to allow first function calls made by the first (e.g., a Java-based) process to be mapped, transferred, and then executed as second function calls (e.g., as C-based function calls) within the second (e.g., C-based) process. In other words, embodiments of the invention allow the operation of application programming interface function calls between the two different and incompatible computing environments.

Before providing a detailed description of the application programming interface analysis and preprocessing briefly mentioned above, an explanation of the runtime operation of embodiments of the invention will be provided with respect to an example computing system environment illustrated in FIG. 1.

FIG. 1 illustrates an example computing system environment 100 which is suitable for use in explaining operations of embodiments of the invention. The computing system environment 100 includes an interconnection of: i) a client computer system 110, ii) a first computing environment 120 (e.g., a Java-based server computer), iii) a second computing environment 130 (e.g., a C-based agent computer), and iv) a resource 140 which in this example is a data storage system. The interconnection of the computing system environment components 110, 120, 130 and 140 is accomplished via communications network facilities that are not shown in detail in this example. The computing system environment 100 may be a storage area network or SAN, for example.

The client computer system 110 operates, executes, interprets, runs or otherwise performs a client process 116 that in this example is a web-based or Java-based process that a user of the client computer 110 can operate. Examples of the client process 116 are an Internet browser application, a Java or other type of applet, or a customized console software application that can interact with the first computing environment 120 to perform various functions.

The first or server computing environment 120 can be any type of computing system such as a workstation, personal computer, minicomputer, mainframe, network device, computerized device or the like. In this example, the first computing environment 120 represents a Java-based server computer system that operates as a server computer on behalf of the client computer 110. By Java-based, what is meant is that the first computing environment 120 includes a computer system configured to operate one or more server software applications written in the Java programming language, such as the first process 126 (e.g., a Java-based server) in this example. The first computing environment 120 in this example also includes a first API string generator 127, a first parser process 128 and a first API definition 129 generated and configured to operate according to embodiments of the invention as will be explained herein.

The second computing environment 130 can also be any type of computing system, computerized device or the like. In this example arrangement, the second computing environment 130 represents an agent computer system that operates a C-based software application execution environment that includes operation of software applications developed in the C programming language, such as the second process 136 which is a C-based agent process in this example. The second computing environment 120 in this example also includes a second API string generator 137, a second parser process 138 and a second API definition 139. As will be explained further, the second API definition 139 provides second function definitions 139-1 which, when invoked were called by other software applications cause the second process 136 to perform processing. In other words, the second process 136 represents the processing logic invoked as a result of a second function definitions 139-1 being called within the second API definition 139.

Throughout the explanation of embodiments of the invention, the terms "first" and "second" will be used to refer to and to distinguish processes and operations (e.g., function calls, function definitions, data structure definitions and so forth) within the first and second computing environments 120 and 130.

According to one example embodiment, the first process 126 that operates in the first computing environment 120 is a storage management server process that allows one or more network storage managers (i.e., persons responsible for managing data storage systems within storage area networks) to operate one or more client processes 116 (only one shown for this example) from client computer systems 110 (e.g., over a network) to interact with the first process 126 to perform network storage management functions. Such functions involve the management of data within the data storage system resource 140. To access the data storage system resource 140, the first process 126 requires the ability to access the second functions 139-1 provided by the second process 136, which in this example is developed in the C programming language and operates as an agent process to provide the data access and management functions 139-1 defined within the second API definition 139. In other words, the second or agent process 136 provides a number of second functions 139-1 related to manipulation and access to the data storage system 140 that must be accessed using C-language function call semantics.

The second API definition 139 may be, for example, one or more C include files (e.g., ".h" files) that define and provide C function call headers for each particular second function definition 139-1 that provides access to the data storage system resource 140. C-based software applications requiring access to such functions can include the second API definition 139 into their source code in order to have access to the data storage system resource 140 through the second process 136. Examples of the second process 136 and its corresponding second API definition 139 and second function 139-1 are embodied within the SymAPI software product suite produced by EMC Corporation of Hopkinton, Mass., U.S.A.

Since the first process 126 is developed using the Java programming language, the first process 126, without the assistance of embodiments of the invention, cannot easily or "natively" access the second functions 139-1 defined within the C-based second API definition 139 as provided by the second process 136. In other words, the Java process 126 cannot make native C function calls to the C functions 139-1 defined in the second API definition 139 due to the inherent limitations and differences between function calls, data structures and other aspects of the object oriented Java programming language as compared to the non-object oriented C programming language.

One operation of embodiments of the invention involves performing and analysis and processing technique (to be explained in detail) upon the second API definition 139 in order to automatically generate or produce the second API string generator 137 (a C-based software process), the second parser process 138 (another C-based software process), the first API string generator 127 (a Java-based software process), the first parser process 128 (another Java-based software process) and the first API definition 129 (a Java version of certain functions associated with the second application programming interface 139). Prior to such an analysis and API processing operation, the C-based agent process 136 and its corresponding second API definition 139 can exist as an off-the-shelf product. However, during the analysis and processing of the second API definition 139 according to the techniques explained herein, a collection of first function call definitions (which are Java based in this example) are created within the first API definition 129 that may be natively accessed by the first process 126 within the first computing environment 120 with the assistance of the first API string generator 127 and the first parser process 128.

Generally, this allows the first process 126 to make first function calls to the first function definitions 129-1 within the first API definition 129 in a natively compatible format, such as by making Java-based function calls. The first API string generator 127 can accept 190 such first function calls and can pass a "meta" or encapsulated version of the first function call parameter values associated with first function calls 129-1 to the second computing environment 130. As will be explained shortly, the first API string generator 127 converts or encapsulates the first function call parameters into an encapsulated function call 153 containing meta parameters which are an intermediate or universal representation of the parameter values and which are exchangeable between the first and second computing environments 120, 130. Within the second computing environment 130, the second parser process 138 receives the encapsulated function call 153 and is able to extract, parser or map the first meta parameters into function call parameters (e.g., into C-based values) required to invoke 191 one or more corresponding second function calls 139-1 defined within the second API definition 139 in order to activate the functionality of the second process 136. When the second process 136 has completed processing of all of the second function call(s), the resulting second function call parameters (i.e., the output of the second function as performed by the second process 136) are accepted 192 by the second API string generator 137 which converts the second function call parameters into corresponding second meta parameters which are passed as an encapsulated response 154 back to the first computing environment 120 to be received by the first parser process 128. The first parser process 128 receives the encapsulated response 154 and is able to parse the encapsulated response to extract or map the second meta parameter values into the corresponding first function call parameters for return 193 to the first process 126. In this manner, the processing techniques of the invention provide the first process 126 with the ability to access functionality defined by the second API definition 139, even though such functionality cannot be natively accessed by the first process 126.

Figure 2:
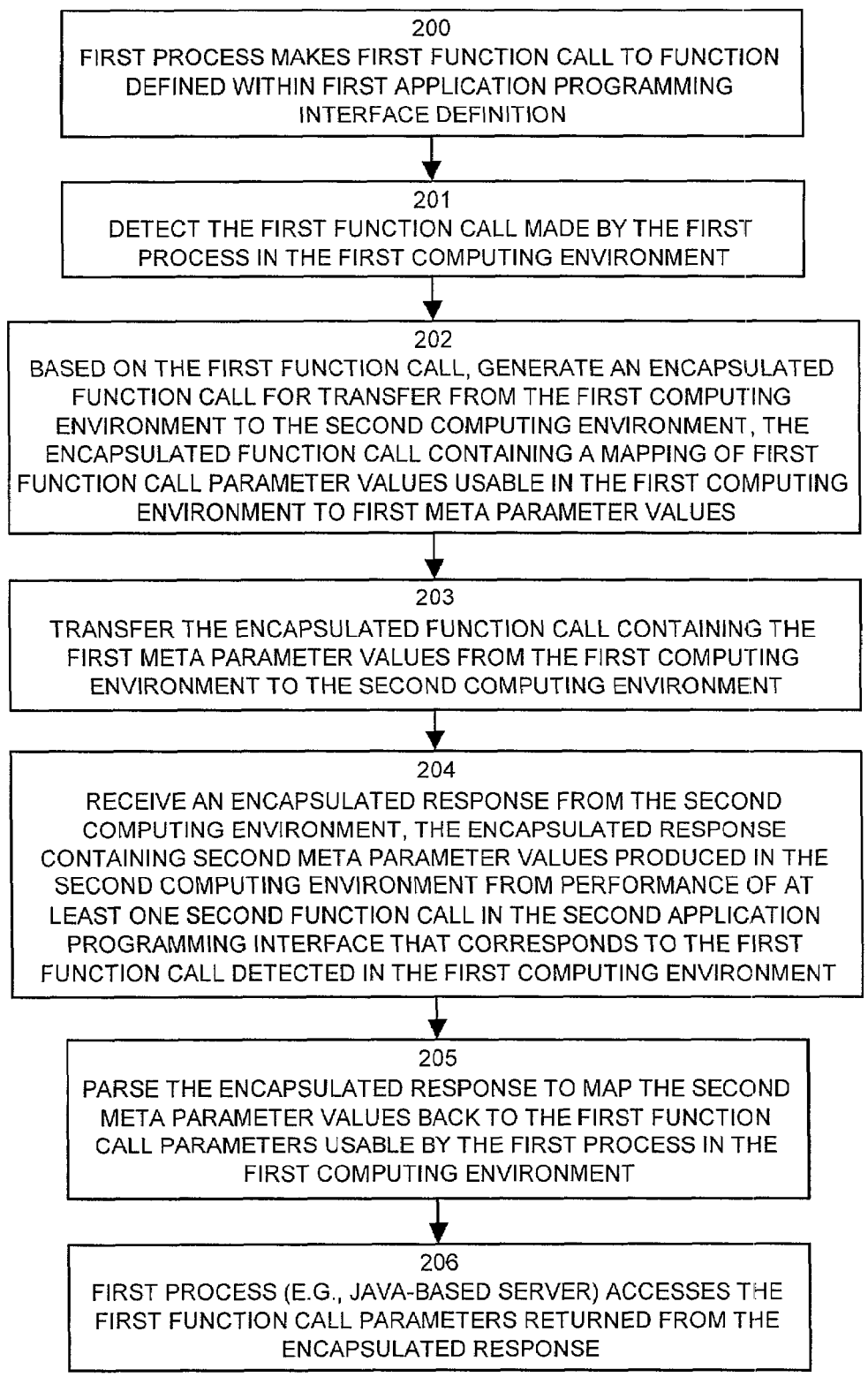
FIG. 2 is a flow chart of processing steps performed according to one embodiment of the invention within a first computing environment to allow a first process to access second functions associated with a second application programming interface provided by a second process that operates in a second computing environment.

A more detailed description of the runtime operation and interaction between the software components 137, 138 and 127 through 129 will be provided next with respect to the flow chart of processing steps illustrated in FIG. 2 and in conjunction with an explanation of example data access and processing operations between the first and second processes 126 and 136.

FIG. 2 illustrates a flow chart of processing steps performed according to one embodiment of the invention to allow the first or server process 126 (e.g., a Java based process) in FIG. 1 to access functions provided by the second or agent process 136 (e.g., a C based process) on behalf of the requesting client process 116.

According to the general runtime operation of the computing system environment 100, a user (e.g., storage administrator) operating the client process 116 on the client computer 110 provides a request for data 151 to the Java-based first process 126 (operating as a server on behalf of the client process). Based on the request for data 151, the first process 126 may determine that access is required to information within the data storage system resource 140. As explained above, such access can only be provided in this example by operating a second function 139-1 defined within the second API definition 139 which is carried out by the second process 136. In order for the Java-based first process 126 to access one or more of the second functions 139-1 provided by the second process 136 as defined in the second API definition 139, the software developer of the first process 126 provides an equivalent Java function call 129-1 to a first function within the code of the first process 126. In other words, the first process 126 includes a call to a corresponding first function definition 129-1 defined within the Java-based first application programming interface definition 129. This first function call 129-1 can accept Java data structures defined according to Java type definitions.

Accordingly, in step 200, during runtime operation of the first process 126, the first process 126 makes a first function call 190 to a first function 129-1 defined within a first application programming interface definition 129. The first application programming interface 129 may be a Java class that includes Java objects for each function call 129-1. The first process 126 can obtain access to the first API definition 129, for example, by inheriting or including a reference to the first API definition 129 within its code. Upon making the first function call 190 in step 200, the first process 126 activates the first API string generator 127 to receive the first function call 190 and any first function call parameters associated with that first function call. In other words, the first function call whose header is defined within the first API 129 references Java software code within the first API string generator 127. By making such a first function call 190, the first process 126 provides first function call parameters in a format that is natively compatible with the first computing environment 120, such as by providing one or more Java-based data structures. Some of the first function call parameters within the first function call 190 may be input parameters in which the first process 126 provides input data for processing by the second process 136, while other first function call parameters may be output parameters which the first process 126 expects to receive back after the second process 136 processes the input parameters.

In step 201, the first API string generator 127 (activated as a result of the first process 126 making the first function call 190 to a first function 129-1 within the first API definition 129) detects the first function call 190 made by the first process 126 within the first computing environment 120. By detects, what is meant is that the first API string generator 127 receives the first function call 190 and any of its associated first function call parameters (not specifically shown or enumerated in FIG. 1).

In step 202, the first API string generator 127, based upon the first function call 190, generates an encapsulated function call 153 or transfer from the first computing environment 120 to the second computing environment 130. The encapsulated function call 153 contains a mapping of first function call parameter values (from the first function call 190) which are usable (i.e., natively accessible) by processes in the first computing environment 120 to first meta parameter values within the encapsulated function call 153.

Next, in step 203, the first API string generator 127 transfers the encapsulated function call 153 containing the first meta parameter values from the first computing environment 120 to the second computing environment 130.

Generally then, in steps 202 and 203, the first API string generator 127 converts the first function call parameters within the first function call 190 into first meta parameters which are collectively referred to herein as an encapsulated function call 153. In one embodiment, the first meta parameters represent an alphanumeric character string of the information that contains any values of the first function call parameters of the first function call 190. In other words, the first API string generator 127 converts the parameters into a string which is then transferred as an encapsulated function call 153 to the second computing environment 130 for receipt, as will be explained shortly, by the second parser process 138.

Figure 3:
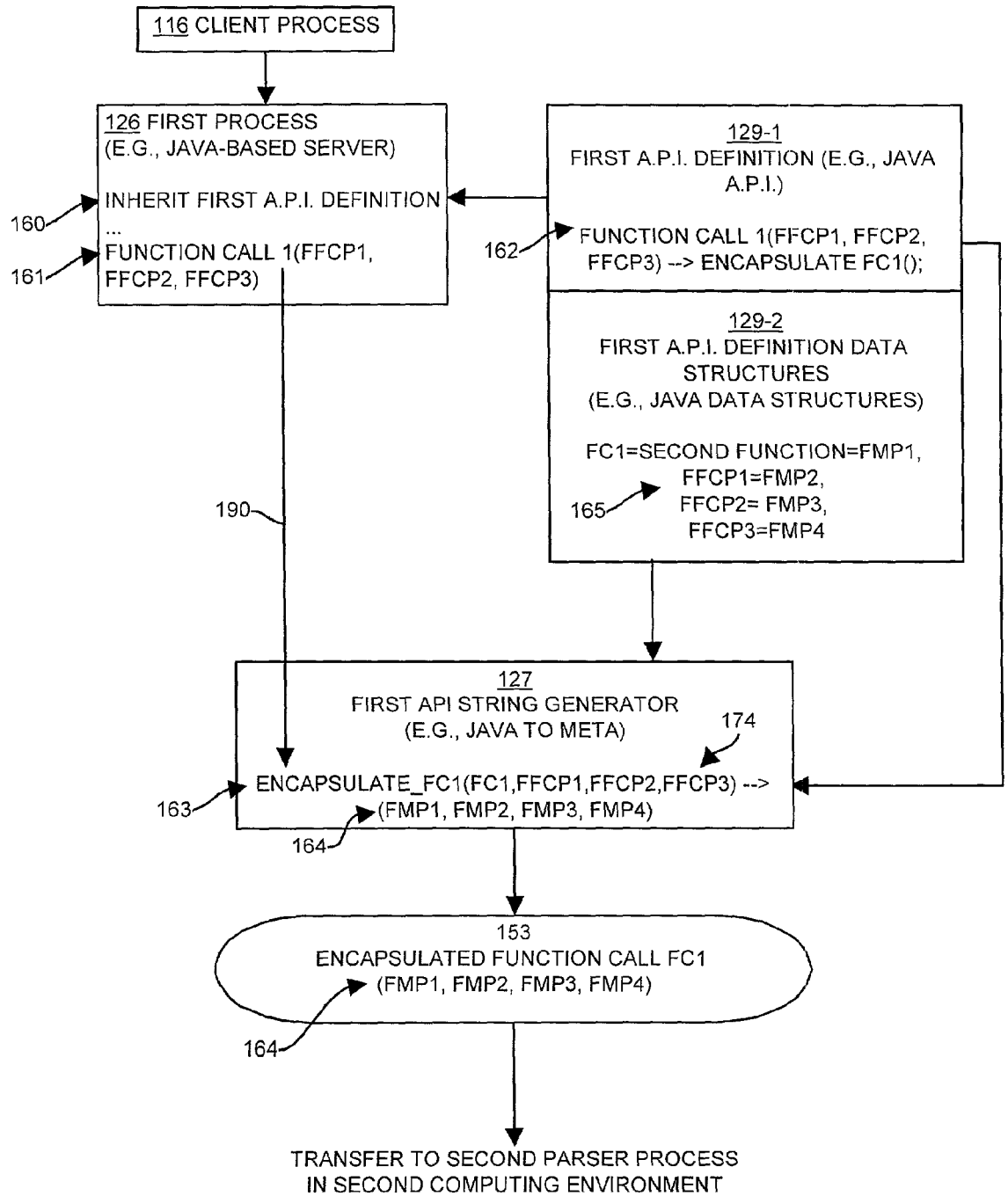
FIG. 3 illustrates an example of processing performed according to one embodiment of the invention to receive a first function call from within a first process and to translate that first function call to an encapsulated function call for transfer to a second computing environment.

FIG. 3 illustrates a more detailed example of the processing explained above with respect to steps 202 and 203 in FIG. 2. As illustrated in FIG. 3, the first application programming interface definition 129 includes a set of first function call definitions 129-1 which define functions 162 for use by, in this example, Java-based software applications such as the first process 126. In this example, only one first function call definition 162 is illustrated and includes three first function call parameters FFCP1 through FFCP3. The first function calls (e.g., 162) correspond to at least one second function call 139-1 defined in the second application programming interface 139 usable by second processes (e.g., 136 in FIG. 1) in the second computing environment. The automatic generation of the first application programming interface definition 129 including the first function call definitions 129-1 by embodiments of the invention will be explained later.

In addition, the first API definition 129 includes first API definition data structures 129-2 that define mappings 165 between first function call parameters (FFCP) and corresponding first meta parameters (FMP). The first function call parameters in FIG. 3 represent any parameters values that the corresponding second function 139-1, defined within the second application programming interface definition 139, will require as input. In this particular example, the first function call 162 includes a representation by a meta parameter data structure named FC1 which maps to a first meta parameter FMP1 and which indicates that a second function (SECOND FUNCTION, defined in the second application programming interface 139) is the equivalent function as the first function call 162. In other words, the first function call definition 162 has an equivalent second function call definition 139-1 within the second application programming interface 139. The remaining first function call parameters FFCP1 through FFCP3 map to corresponding first meta parameters FMP2 through FMP4 which as noted above serve, in this example, as input parameters to a corresponding second function call definition within the second application programming interface 139.

In one embodiment, first function calls such as first function call 162 are defined in a Java-based format usable by Java-based first processes (e.g., 126) and the first function calls 129-1 map to second function calls 139-1 within the second application programming interface 139. The second function calls are defined in a C-based format usable by a C-based second processes, such as second process 136.

As shown at location 160 within the code (e.g., Java code) of the first process 126, the first process 126 inherits the first application programming interface definition 129. This allows the first process 126 to have access to the function call definitions (e.g., 162) within the first application programming interface definition 129. During operation (e.g., execution or interpretation) of the first process 126, upon invocation 190 of the first function call 161, the first process 126 makes a call 190 to the encapsulate function call 163 within the first API string generator 127 by calling the first function call definition 162. In other words, the encapsulated function 163 operates as the code or body of the first function call 162 and creates the encapsulated function 153.

To create or generate the encapsulated function 153, the first API string generator 127 also accesses the first application programming interface definition 129 that defines the first function calls (e.g., 162) usable by first processes (e.g., 126) in the first computing environment 120. Specifically, the first API string generator 127 references the first API definition data structures 129-2. Using this information, the encapsulate function call 163 can extract the first function call parameters FFCP (i.e., any input parameters data structures used or required by the first function call 161, 162) from the first function call 161 (called using the function definition 162) into first meta parameters 164 using the mapping 165 within the first application programming interface 129. For each of the first function call parameters FFCP1 through FFCP3, the encapsulate function 163 can select a respective first application programming interface definition data structure from the map 165 that can represent the first function call parameter FFCP as a first meta parameter FMP. In other words, when the first process 126 makes the first function call 161, the encapsulate function call 163 is activated 190 to receive the first function call parameters FFCP1 through FFCP3 (i.e., any input parameters, values) and can consult the first API definition data structures 129-2 to determine an appropriate respective first meta parameter data structure FMP2 through FMP4 that can be used to represent each respective first function call parameter. Once such a meta parameter data structure is selected from the map 165, the encapsulate function 163 copies the first function call parameter (i.e., the input parameter value) into the respective first meta parameter. In one embodiment, this copy procedure produces a set of first meta parameters that contain strings that represent the respective values of the first function call parameters.

An example of this processing is illustrated in FIG. 3 by the first meta parameters FMP1 through FMP4. Note in this example that the first meta parameter FMP1 is not mapped to a specific function call parameter, but rather represents the identity of the first function call 162 itself, whereas the first meta parameters FMP2 through FMP4 contain string values that contain the input values of the first function call parameters FFCP1 through FFCP3. Accordingly, the collection of first meta parameters FMP1 through FMP4 identify the first function call 161, 162 (using FMP1) as well as any first function call input parameters associated with that first function call. In this manner, the first API string generator 127 generates the encapsulated function call 153 for transfer (step 203 in FIG. 2) to the second computing environment 130 for receipt by the second parser process 138.

After step 203 in FIG. 2, the second parser process 138 within the second computing environment 130 receives and processes the encapsulated function call 153.

Figure 5:
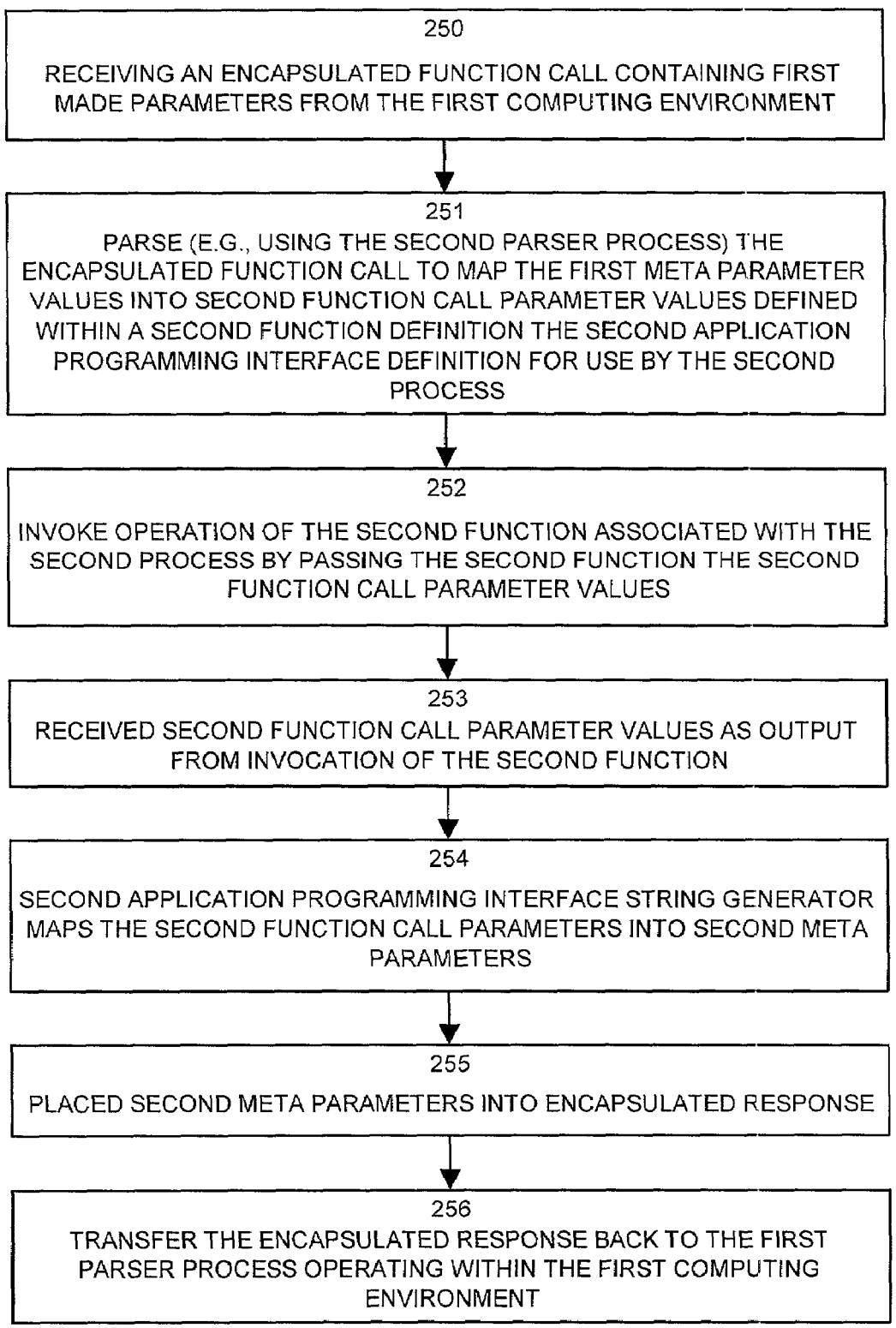
FIG. 5 is a flow chart of processing steps performed according to one embodiment of the invention in a second computing environment to allow a second process to receive function calls to second functions from remotely operating first process is operating first computing environments.

Accordingly, prior to completing the discussion of the remaining processing steps in FIG. 2 that occur within the first computing environment 120, attention is directed now to FIG. 5 that contains a flow chart of processing steps 250 through 256 which occur within the second computing environment 130 in order to receive and process an encapsulated function call 153 and to produce and return an encapsulated response 154 back to the first computing environment 120.

Figure 4:
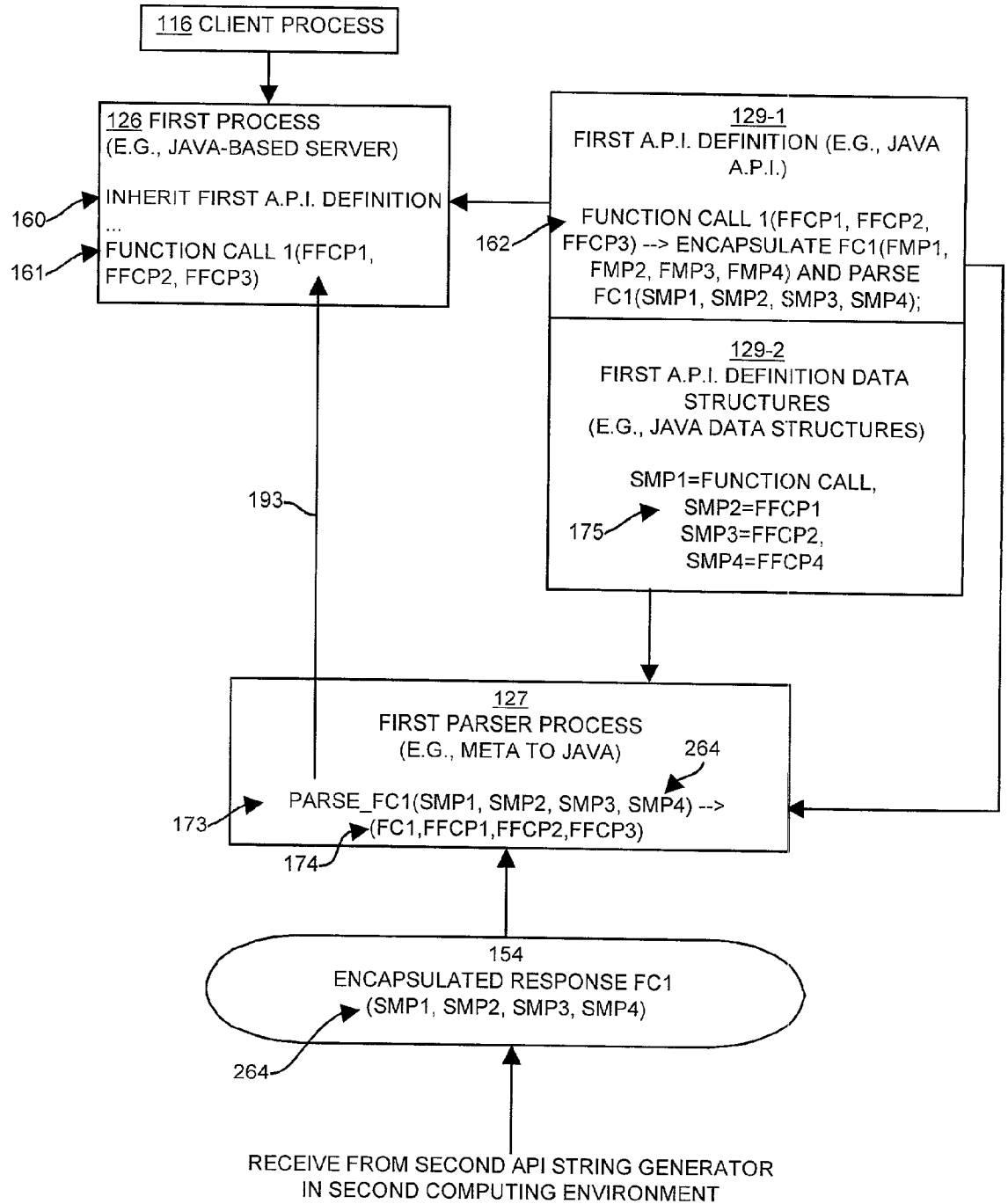
FIG. 4 illustrates an example of processing performed according to one embodiment of the invention in a first computing environment to receive an encapsulated response from a second computing environment and to parse the encapsulated response to return values to a first function call made from a first process operating in a first computing environment.
Figure 6:
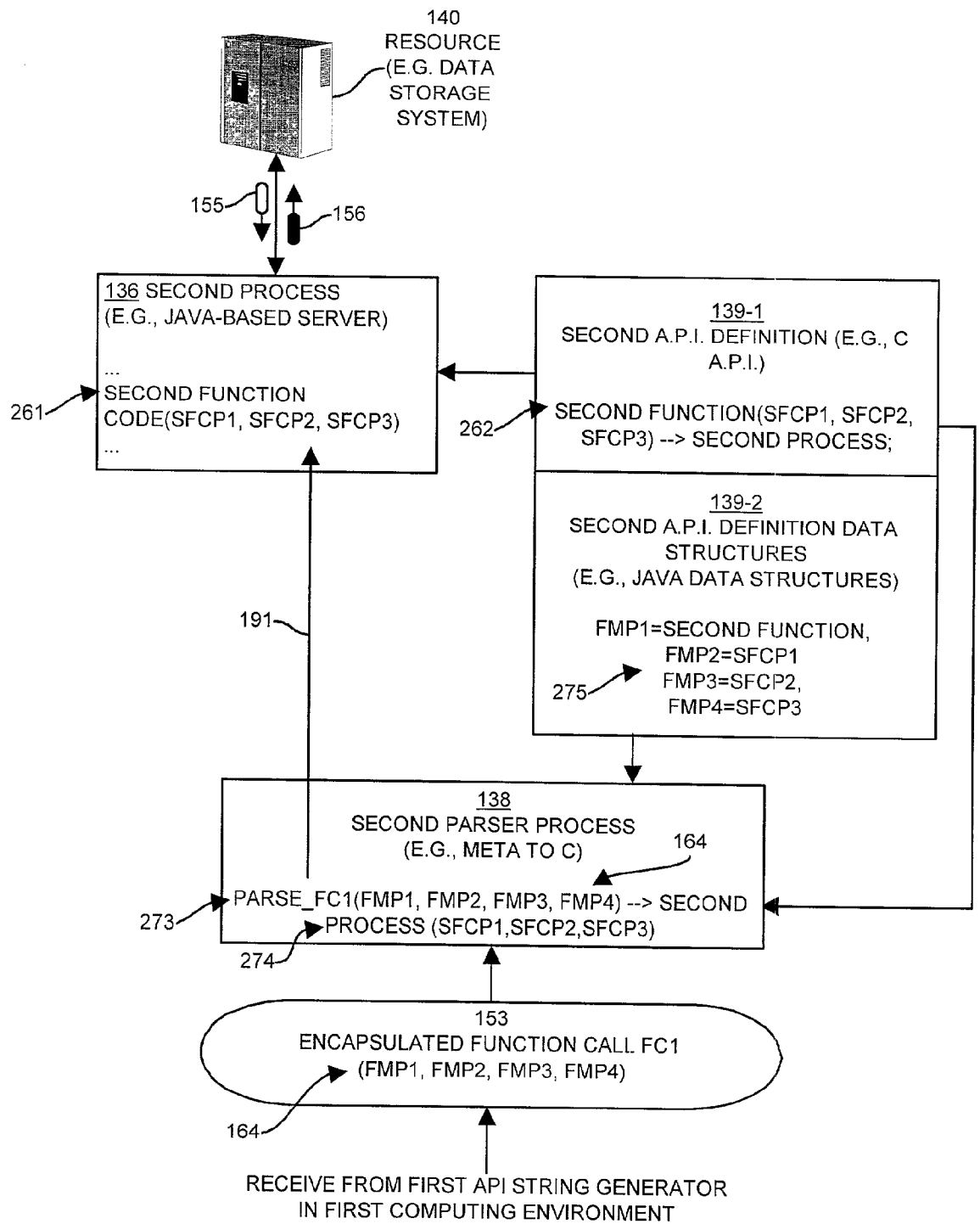
FIG. 6 illustrates an example of processing performed according to one embodiment of the invention in a second computing environment to receive an encapsulated function call transferred from a second computing environment and to parse the encapsulated function call in order to invoke a second function within a second process in the second computing environment.
Figure 7:
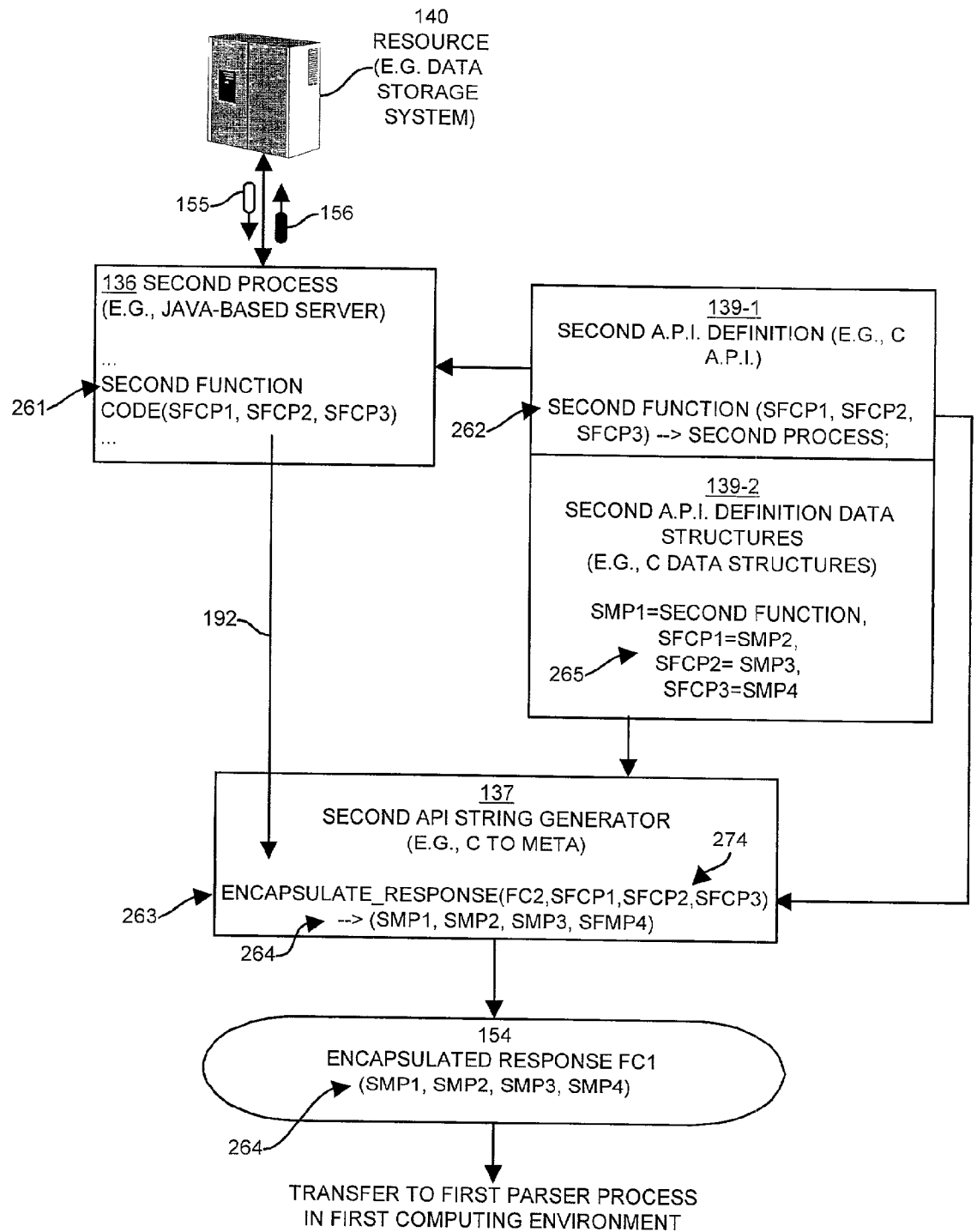
FIG. 7 illustrates an example of processing performed according to one embodiment of the invention in a second computing environment to receive an output from operation of a second function performed by a second process and to encapsulate the output into an encapsulated response for transfer back to a first parser process operating in a first computing environment.

FIG. 5 illustrates a flow chart of processing steps as performed within the second computing environment 130 according to one example embodiment of the invention. In particular, the processing steps 250 through 256 are performed, as will be explained, by the second parser process 138 and the second API string generator 137. In conjunction with FIG. 5, FIGS. 6 and 7 illustrate an example of the processing operations performed according to the steps 250 to 256. Generally, the operation of the processing shown in FIGS. 6 and 7 corresponds to the example operation of the processing shown in FIGS. 3 and 4. Specifically, FIG. 3 shows an example of producing an encapsulated function call 153 which is then received and processed in FIG. 6 to activate the second function 261, 262 within the second application programming interface 139 (and within the second process 136) and for which the output parameters of the second function 261 (from the second process 136) are received and processed in FIG. 7 in the second computing environment 130 to produce and return an encapsulated response 154 (via the second application programming interface string generator 137) which is transferred to the first parser process which then receives the encapsulated response 154 and processed this response 154 according to the example processing shown in FIG. 4. FIGS. 3 and 4 thus illustrate an example of the processing within the first computing environment 120, while FIGS. 6 and 7 illustrate an example of the processing within the second computing environment 130.

In step 250 in FIG. 5, the second parser process 138 (FIG. 6) receives the encapsulated function call 153 that contains the first meta parameters (i.e., 164 from FIG. 3) from the first computing environment 120.

In step 251, the second parser process 138 parses the encapsulated function call 153 to map the first meta parameter values (164 from FIG. 3 which represent input parameters values) into second function call parameter values 274 (FIG. 6) defined within a corresponding second application programming interface definition data structures section 139-2 of the second application programming interface definition 139.

Next, in step 252, the second parser process 138 invokes operation of the second function 261, 262 (FIG. 6) associated with the second process 136 by passing the second function 161 the second function call parameter values 274 extracted from the first meta parameters FMP2 through FMP4. In other words, the second function 262 in the second application programming interface 139 is invoked within the second process 136 using any required input parameters values as received within the set of first meta parameters values FMP1 through FMP4 (collectively 164 in FIG. 3).

FIG. 6 illustrates an example of the processing operations discussed above with respect to steps 250 through 252. In particular, as shown in FIG. 6, the second parser process 138 receives the encapsulated function call 153 containing the first meta parameter values FMP1 through FMP3 (164 in FIG. 3). These first meta parameter values contain any input parameter values produced by the first process 126, as discussed above with respect to FIG. 3. The second parser process 138 invokes a parser function 273 in order to map or convert the first meta parameter values (e.g., strings) into second function call parameter values 274 (e.g., input values within proper C data structures) by accessing the second API definition 139.

In particular, the second parser process 138 can access second API definition data structures 139-2 which contain a mapping 275 that indicates which first meta parameter values map to which second function call parameter values. Also as shown in this example, the first meta parameter value FMP1 identifies which specific second function call 262 within the second API definition 139-1 is to be invoked within the second process 136. Using this information, the second parser process 138 can thus map the first meta parameter values FMP2 through FMP4 into corresponding second function call parameter values SFCP1 through SFCP3 (i.e., input values) and can then call or otherwise invoke operation of the second function code 261 within the second process 136, passing the second function 261 the second function call parameter values 274 as input. This causes the second process 136 to operate or otherwise perfomi the second function code 261 to interact with the data storage system resource 140 by sending data storage system commands 156 that produce data storage system results 155. The second process 136 may then return data storage system results 155 as output within the second function call parameter values SFCP1 through SFCP3 back to the second function 261. This processing and a corresponding example operation will be explained now with respect to steps 253 to 256 in FIG. 5 and an example illustrated in FIG. 7.

Returning attention now to the flow chart of processing steps shown in FIG. 5, in step 253, the second API string generator 137 operating within the second computing environment 130 receives the second function call parameter values as output from invocation of the second function 261.

In step 254, the second API string generator 137 maps the second function call parameters into second meta parameters. In other words, in steps 253 and 254, upon completion of operation of the second function 261 within the second process 136, any return results or output are provided to the second API string generator 137 which receives the second function call parameters and maps them into corresponding second meta parameters.

Next, in step 255, the second API string generator 137 places the second meta parameters into an encapsulated response 154 for return to the first computing environment 120. The second meta parameters in one embodiment of the invention are alphanumeric character strings which represent a string conversion and concatenation of the values returned in each of the second function call parameters produced from processing the second function code 261 in the second process 136.

In step 256, the second API string generator 137 transfers the encapsulated response 154 back to the first parser process 128 operating within the first computing environment 120. Thereafter, the first parser process 128 operates as previously explained with respect to FIG. 4 in order to process the second meta parameters contained within the encapsulated response 154 for return to the first process 126.

FIG. 7 illustrates an example of the processing explained above with respect to steps 253 through 256 in FIG. 5. In particular, as illustrated in FIG. 7, the second process 136 operates the second function code 261 to produce return or output values in the second function call parameters SFCP1 through SFCP3. In this example then, the second function call parameters SFCP1 through SFCP3 are used as both input and output parameters in that they contain data values that the second function 261 uses when called and contain return or output results when this second function 261 is complete. The second API string generator 137 can operate an encapsulated response function 263 to receive these second function call parameters and can map them to corresponding second meta parameters SMP2 through SMP4 using the map 265 within the second application programming interface definition data structures 139-2. In addition, the second API string generator 137 can create a second meta parameter SMP1 that indicates that the second meta parameters SMP2 through SMP4 are associated with the return results or output of the second function 261. In one embodiment of the invention, the second meta parameters SMP1 through SMP4 are alphanumeric character strings values which form a contiguous string the encapsulated response function 263 converts into the encapsulated response 154. The second API string generator 137 can consult the second API definition 139, and in particular, the second API definition data structures 139-2 to determine which second function call parameters are to be mapped 265 to which second meta parameters.

Generally, as explained above, the second parser process 138 can receive and map the first meta parameters into second function call parameters defined within the second API definition 139 for use by the second process 136. The second parser process 138 thus converts the first meta parameters within the encapsulated function call 153 into values that are compatible for activation of a corresponding second function call definition (corresponding to the first function call 161, 162) within the second API definition 139. The second parser process 138 then calls the appropriate second function call definition 139-1 thus activating the functionality of second process 136, which in this example accesses the data storage system resource 140. Thereafter, the second process 136 operates on the return data 155 and returns second function call parameter values 274 (e.g., output parameter values) back to the second API string generator 137 within the second computing environment 130. The second API string generator 137 then operates in a similar manner as explained above with respect to the first API string generator 127 to convert these C-based second function call parameter values 274 returned from the second process 136 into second meta parameters (e.g., strings) 264 and places the second meta parameters into the encapsulated response 154. The second API string generator 137 then returns the encapsulated response 154 back to the first parser process 128 operating within the first computing environment 120.

Directing attention now back to step 204 in FIG. 2, the first parser process 128 operating within the first computing environment 120 receives an encapsulated response 154 from the second computing environment 130. The encapsulated response 154 contains second meta parameter values 264 produced in the second computing environment 130 from performance of at least one second function call 262 defined within the second application programming interface 139. The second function call (of which there may be more than one) corresponds to the first function call 190 (or as illustrated in detail as 161 in FIG. 3) detected by the first API string generator 127 in the first computing environment 120. In other words, the encapsulated response 154 represents any return values 155 that the second process 136 in second computing environment 130 produces as a result of having processed the values associated with the first meta parameters 164 in the encapsulated function call 153.

Next, in step 205, the first parser process 128 parses the encapsulated response 154 in order to map the second meta parameter values (e.g., the strings containing output values of the second function 261) 264 back to the first function call parameters FFCP1 through FFCP3 for use by the first process 126 in the first computing environment 120. Generally, the processing of step 205 is the reverse processing of step 202 in that the first parser process 128 converts second meta parameters 264 within the encapsulated response 154 into return values 193 to be supplied (i.e., 193 in FIG. 1) back to the first process 126 within the appropriate first function call parameters of the first function call 161.

In step 206, the first process 126 then accesses the first function call parameters returned from the encapsulated response 154, as provided 193 by the first parser process 128, as shown in the example in FIG. 1.

FIG. 4 illustrates an example of the processing discussed above with respect to processing steps 204 through 206 from the flow chart of processing steps in FIG. 2. As illustrated in FIG. 4, the first function call 161 is defined within the first API definition 129-1. As explained above with respect to steps 204 and 205 (FIG. 2), when the first parser process 127 receives an encapsulated response 154 back from the second computing environment 130, the first function call definition 162 indicates that the parse function call 173 associated with the first parser process 127 is to be used to parse the encapsulated response 154 in order to extract second meta parameter values (e.g., any output values) which are mapped back to the appropriate first function call parameters 174 which are then returned 193 to the first process 126.

The functionality of the first parser process 127 illustrated in FIG. 4 thus performs a reverse mapping operation as compared to the first API string generator 127 previously explained with respect to FIG. 3. That is, the first API string generator 127 in FIG. 3 generates a string of input meta parameter values based on input function call parameters. The string generator 127 then passes the input meta parameter values to the second computing environment for invocation of a function within the second API definition 139. Upon completion of the function, the second API string generator 137 operates in a similar manner as the first API string generator 127 to create a string of output second meta parameter values representing the second function call parameters 174 returned or output as a result of the processing performed by the second process 136. When the second meta parameter values (e.g., the output parameters) are returned to the first computing environment 120 within the encapsulated response 154, the first parser process 128 is responsible for mapping the second meta parameter values into the appropriate first function call parameters 174 (e.g., output parameters) for return to the first function call 190 in the first process 126.

With respect to the illustration in FIG. 4, the first parser process 127 receives the encapsulated response 154 to the first function call 161. The encapsulated response includes second meta parameters SMP1 through SMP4. In this particular example, the second meta parameters happen to correspond one-to-one with the first meta parameters FMP1 through FMP4 provided in the encapsulated function call 153 (FIG. 3). In other words, the second meta parameters contain any return or output information, data or function values produced as a result of operation of the second process 136 in response to receipt of the first meta parameter values within the encapsulated function call 153.

It is to be understood that there need not be a one-to-one correspondence between the input and output parameters for the first and second meta parameters and first and second function call parameter values. That is, it may be the case in another example that the first function call 161 uses a set of first function call parameters that contain input parameters values that are then mapped to first meta parameters, and that the second function 261, 262 accepts these and produces a set of output parameter values that are different and are thus mapped (i.e., by the second parser string generator 137 in FIG. 7) into different second meta parameters for return to the first function 161 in a set of different first function call parameters. In other words, in the aforementioned example, the first function call parameters FFCP2 through FFCP3 all contained input values that were mapped (FIG. 3) to first meta parameters FMP2 through FMP4 which were then provided as input values to the second function 261 (FIG. 6) second function call parameters SFCP1 through SFCP3. These same second function call parameters SFCP1 through SFCP3 also were used as output parameters from the second function 261 and were mapped back into second meta parameters SMP2 through SMP4 (FIG. 4). In the alternative, it may be the case for example that the first (161) and corresponding second function (261) can use certain parameters as input parameters and other parameters as output parameters in which case one corresponding set of first function call parameters FFCP's, first meta parameters and second function call parameters SFCPs would be used in FIGS. 3 and 6 as opposed to a different set of parameters for FIGS. 4 and 7.

Also as shown in FIG. 4, when the first parser process 127 receives the encapsulated response 154, the first parser process 127 parses the encapsulated response 154 to detect the second meta parameters SMP1 through SMP4. Then, for each of the second meta parameters that are detected in the encapsulated response 154, the first parser process 127 selects a respective first application programming interface definition data structure 175 within the first application programming interface 129 (specifically 129-2) that can map the second meta parameter to an appropriate first function call parameter. In other words, for each output meta parameter within the encapsulated response 154, the first parser process parses the encapsulated response and determines an appropriate data structure (a Java data structure in this particular example) that maps to the meta parameter in order to receive the output value from the meta parameter. Thereafter, the first parser process 127 copies the second meta parameter values SMP1 through SMP4 into respective first application programming interface definition data structures 175 to produce first function call parameters that contain the values of the second meta parameters. The first parser process 127 then returns the resulting first function call parameters FFCP1 through FFCP3 back to the first function call 161 made within the first process 126.

As a result of this processing, the first function call 161 and hence the first process 126 receive return data or output processed according to one or more second functions provided by the second process 136 in the second computing environment 130. This embodiment of the invention thus allows the first process 126 to access functions within the second API definition 139 even though the first process 126 cannot make natively compatible function calls to the second API definition 139.

In the aforementioned example embodiments of the invention, the first function calls 129-1 defined within the first application programming interface 129 are defined in a Java-based format usable by Java-based first processes 126.

In addition, the second function calls 139-1 defined within the second application programming interface definition 139 are defined in a C-based format usable by C-based second processes 136. It is to be understood that these are example embodiments of the invention and that the invention is not limited to operation in only Java and C computing environments. Embodiments of the invention can also be used to provide similar functionality to allow programs written in other languages besides Java and C to operate in a similar manner.

In addition, in the aforementioned example, the first function call 161, 162 maps directly to, or corresponds one-to-one with, a second function call definition 261, 262 defined within the second application programming interface definition 139. As an example, if the first function call 161 were a "READ_DATA" function call formatted according to Java syntax and semantics, a similar corresponding second function call named "READ_DATA" that accepts C parameters exists within the second API definition 139. Accordingly, when the second parser process 138 within the second computing environment 130 receives an encapsulated function call 153 for the "READ_DATA" first function call, the second parser process 138 can perform a one-to-one mapping or conversion of the first meta parameters (e.g., string values) of the encapsulated function call 153 into C-based second function call parameters associated with the "READ_DATA" second function calls defined within the second API definition 139. As noted above, also in the former example, the parameters used for the first and second functions 161 and 261 are all both input and output parameters, though this does not have to be the case and this is by way of example only.

It is to be understood that the aforementioned technique for passing the identities and parameter values for function calls between the first computing environment 120 into second computing environment 130 are explained by way of example embodiments only. That is, the aforementioned technique of using a meta parameter such as a string value to contain an identity of a corresponding function within the second API definition 139 which is to be invoked upon receipt of the encapsulated function call 153 is one technique for providing such function identification. In an alternative arrangement, there can be separate and distinct encapsulated function calls 163 that correspond to one or more specific second functions within the second API definition 139. Using the "READ_DATA" example from above, there can be a "READ_DATA" encapsulated function call 163 that only requires receipt of the specific first function call parameters FFCP1 through FFCP3. First meta parameter FMP1 would not be required in this alternative embodiment since the actual function call itself 163 identifies or corresponds to the specific second function or functions within the second API definition 139 to which the first meta parameters should be passed.

It is further to be understood that in one embodiment of the invention, the first meta parameters contain strings that represent values of the first function call parameters. In addition, the second meta parameters contains strings that represent values of the second function call parameters returned from the second process 136. The use of alphanumeric character strings to represent values of the function call parameters (both first and second function calls within the first and second computing environments) is done by way of example only. Other techniques of encoding data into different interchangeable formats could be used as well.

Figure 8:
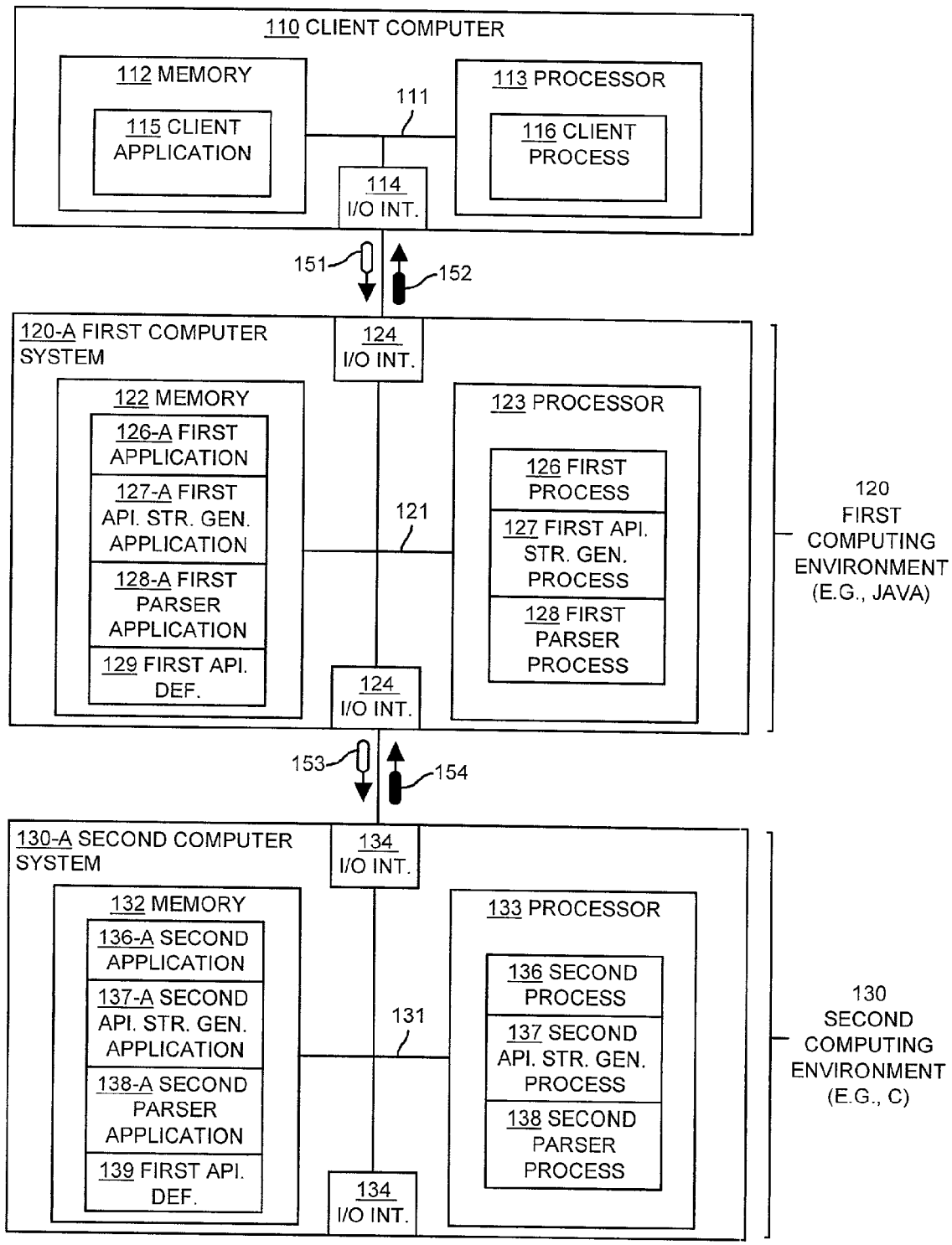
FIG. 8 illustrates architectures of computing system environments configured according to one embodiment of the invention.

FIG. 8 illustrates details of the architecture of the client computer 110, the first computing environment 120 and the second computing environment 130 configured according to one embodiment of the invention. In this example, the first computing environment 120 and second computing environment 130 include first and second computer systems 120-A and 130-A. The client computer system 110, first computer system 120-A and second computer system 130-A may be any type of computerized devices such as a personal computers, workstations, portable computing devices or the like. The computer systems 110, 120-A and 130-A each include a respective interconnection mechanism 111, 121, 131 which couples a respective memory system 112, 122, 132, a respective processor 113, 123, 133, and a respective input/output interface 114, 124, 134. The input/output interfaces 114, 124, 134 allow the computer systems 110, 120-A and 130-A to communicate with other software or hardware devices.

The memory systems 112, 122 and 132 are encoded with software applications as illustrated. In particular, the memory system 112 in the client computer system 110 is encoded with a client application 115. In the first and second computer systems 120-A and 130-A, the respective memory systems 122 and 132 are encoded with the following software applications: respective first and second applications 126-A and 136-A; respective first and second application programming interface string generator applications 127-A and 137-A; respective first and second parser applications 128-A and 138-A; and respective first and second application programming interface definitions 129 and 139. The respective applications 115, 126-A, 127-A, 128-A and 136-A, 137-A and 138-A represent software code such as data and/or logic instructions (e.g., stored in the memory or on another computer readable medium such as a disk or other storage media) that embody the processing functionality of respective portions of embodiments of the invention. Generally, the respective processors 113, 123 and 133 in each of the computer systems 110, 120-A and 130-A can access their respective memory system 112, 122 and 132 via the respective interconnection mechanism 111, 121, 131 in order to launch, run, execute, interpret or otherwise perform the logic instructions of the applications 115, 126-A, 127-A, 128-A and 136-A, 137-A and 138-A in order to produce the respective processes 116 and 126, 127, 128 and 136, 137 and 138. In other words, the processes 116 and 126, 127, 128 and 136, 137 and 138 represent one or more portions of the applications 115, 126-A, 127-A, 128-A and 136-A, 137-A when performing within or upon the respective processors 113, 123 and/or 133.

Is to be understood that embodiments of the invention include the applications 126-A, 127-A, 128-A and 136-A, 137-A and 138-A (i.e., the un-executed or non-performing logic instructions and/or data) encoded within a computer readable medium such as a floppy disk, hard disk or in an optical medium, or in firmware, read only memory (ROM), or, as in this example, as executable code within the memory systems 122 and/or 132 (e.g., within random access memory or RAM). It is also to be understood that other embodiments of the invention comprise the applications 126-A, 127-A, 128-A and 136-A, 137-A and 138-A operating as respective processes 126, 127, 128 and 136, 137 and 138 operating within the processors 123, 133. While not shown in this example, those skilled in the art will understand that the computer systems 110, 120-A and 130-A may also include other processes and/or software and hardware components, such as operating systems, which have been left out of the illustrations for ease of description of embodiments of the invention.

Figure 9:
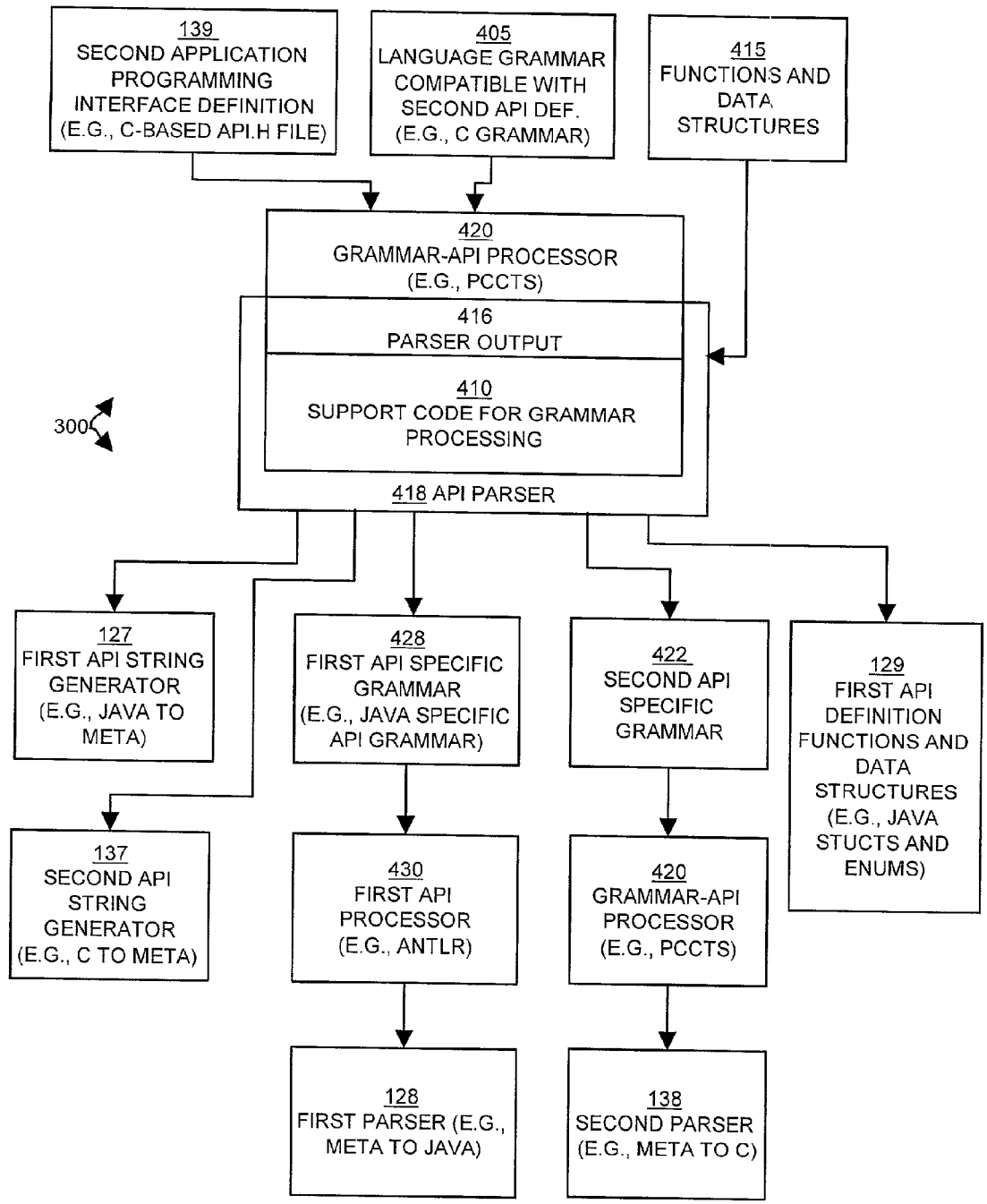
FIG. 9 illustrates a processing and data flow diagram that shows an application programming interface analysis and processing techniques as performed according to one embodiment of the invention.

FIG. 9 illustrates an application programming interface definition grammar analysis and processing environment 300 configured according to one embodiment of the invention. The environment 300 includes a grammar API processor 420 which is a software process that is capable of processing source code written according to a programming language against a language grammar that defines the semantics and constructs of that programming language. In this embodiment of the invention, the grammar API processor 420 processes, as input, the second application programming interface definition 139 in conjunction with a language grammar 405 that is compatible with the programming language in which the second application programming interface definition 139 is written (the C language in this example). In operation, the grammar API processor 420 produces parser output 418 which is linked with support code for grammar processing 410 to produce an application programming interface processor 418. The application programming interface processor 418 can receive a list of functions and data structures 415, that may be stored in a file, for example. As output, the API processor 418 produces the first and second API string generators 127 and 137, first and second API grammars 428 and 422, and the first API definition 129 containing the function definitions 129-1 (FIG. 3) and data structure definitions 129-2 (FIG. 3). The first application programming interface specific grammar 428 is further processed by a first application programming interface processor 430 to produce the first parser 128 and the second application programming interface specific grammar 422 is further processed by the grammar application programming interface processor 420 to produce the second parser 138.

In this example, the second application programming interface definition 139 is a C-based include file that defines second function calls that the second process 136 (FIG. 1) can operate to provide the capability of the second functions 139-1 defined within the API definition 139. In other words, the application programming interface definition 139 may be a source code file such as a C-style include or ".h" file which defines second function definitions 139-1 (e.g., function calls) associated with the application programming interface that the second process 136 can operate upon (e.g., provide the function code for). Other C-based software applications can access the functions of the application programming interface 139 by including the second application programming interface definition file 139 into their source code along with calls to the specific second functions 139-1 defined within the second application programming interface 139.

Generally, based on the analysis of this second API definition 139 in conjunction with the other inputs 405 through 415 and some additional processing which will be explained, embodiments of the invention produce the aforementioned software components 127, 137, 128, 138, 129 that, as explained above, can allow a program or software application that is developed in a different programming language (e.g., Java) or that operates on a different computing system platform (e.g., a Java based platform) to access the functions within the API definition. Prior to the explanation of the operation of the grammar API processor 420 as illustrated in FIG. 9, some details concerning the contents of the support code 410 and the functions and data structures file 415 will be provided to assist in understanding the analysis operation discussed thereafter.

In this example, the support code 410 for grammar processing contains C-code instructions such as "printf statements" indicating what the grammar API processor 420 is to produce as output upon the occurrence of detecting a specific second function definition 262 (e.g., as shown in FIGS. 6 and 7) while parsing the second application programming interface definition 139. The specific second functions 262 that the support code 410 is associated with are defined in the second functions and data structures file 415. That is, the grammar API processor 420 operates to take as input the grammar 405 to generate parser code 416. The parser code 416 is then linked with the support code 410 to make the API processor 418. The API processor 418 operates to takes as input the second API definition 139 and the functions and data structures file 415 (which lists the functions of interest, such as 161 in FIG. 3 for use by the first process 126) to completely parse the second API 139 and then uses the support code 410 to produce the string generators 127 and 137, grammars 428 and 422, and first API definition 129.

Generally, the support code 410 provides call back functions and post processing functions that operate on a knowledge base created from the initial parsing of the API 139 by the grammar application programming interface processor 420. Thereafter, the parser output 418 is linked with the support code 410. The functions and data structure file 415 is used by the support code 410 during the initial parse of the second application programming interface 139 in order to build up the knowledge base. The functions and data structure file 415 indicates what functions are of interest (i.e., are callable by the first process 126 in FIG. 3) and what overrides need to be made to the default heuristics of how parameters are handled for such functions. By the end of the parsing phase, all of the decisions have been made about how each function (e.g., 262 in FIG. 6) and each argument is to be handled as either input or output.

The functions and data structures file 415 thus defines a set of default overriding heuristics or rules for certain variable data structures defined within the second application programming interface definition 139 if those data structures need to override the default heuristic provided by 410. By way of example, in addition to specifying which second function definitions within the second API definition 139 are of interest for "conversion" for use in the first computing environment 120, the second API definition 139 also contains one or more global type definitions for variables and parameters that are accessible by the second function definitions. As those skilled in the art understand, application programming interface definition files can contain many data structures 275 (FIGS. 6 and 7) which are globally accessible from many functions 262 within the application programming interface 139. The functions and data structures file 415 lists or otherwise indicates only those parameters or data structures that require overriding from the default heuristics handling specified in 410. In other words, the functions and data structures file 415 lists exceptions for data structures within the second API definition 139 that are either input or output to second function definitions listed within the functions and data structures file 415 and specifies the role that those parameters are to take in a function call as opposed to their default role specified in 410. As indicated above, the second functions listed within the functions and data structures file 415 are those functions for which a first process 126 will be able to access as first functions 162 (FIGS. 3 and 4) using the aforementioned techniques. As an example, if an "int *" parameter by default is interpreted as an output parameter to a function call 262 in the second application programming interface definition 139, if in another specific function it is meant to be an input parameter (as opposed to the default handling as an output parameter), then the functions and data structures file 415 can specify that this parameter for this function is to be treated as an input parameter. In addition, if all "int" parameters in a function should be interpreted as input parameters in the entire application programming interface 139, then the functions and data structures file 415 can specify this as well.

According to one embodiment of the invention, the grammar API processor 420 is an off-the-shelf software product which is publicly available. In particular, the grammar API processor 420 in one example embodiment is one or more software processes contained within the Purdue Compiler Construction Toolset available from the www.antlr.org.

Figure 10:
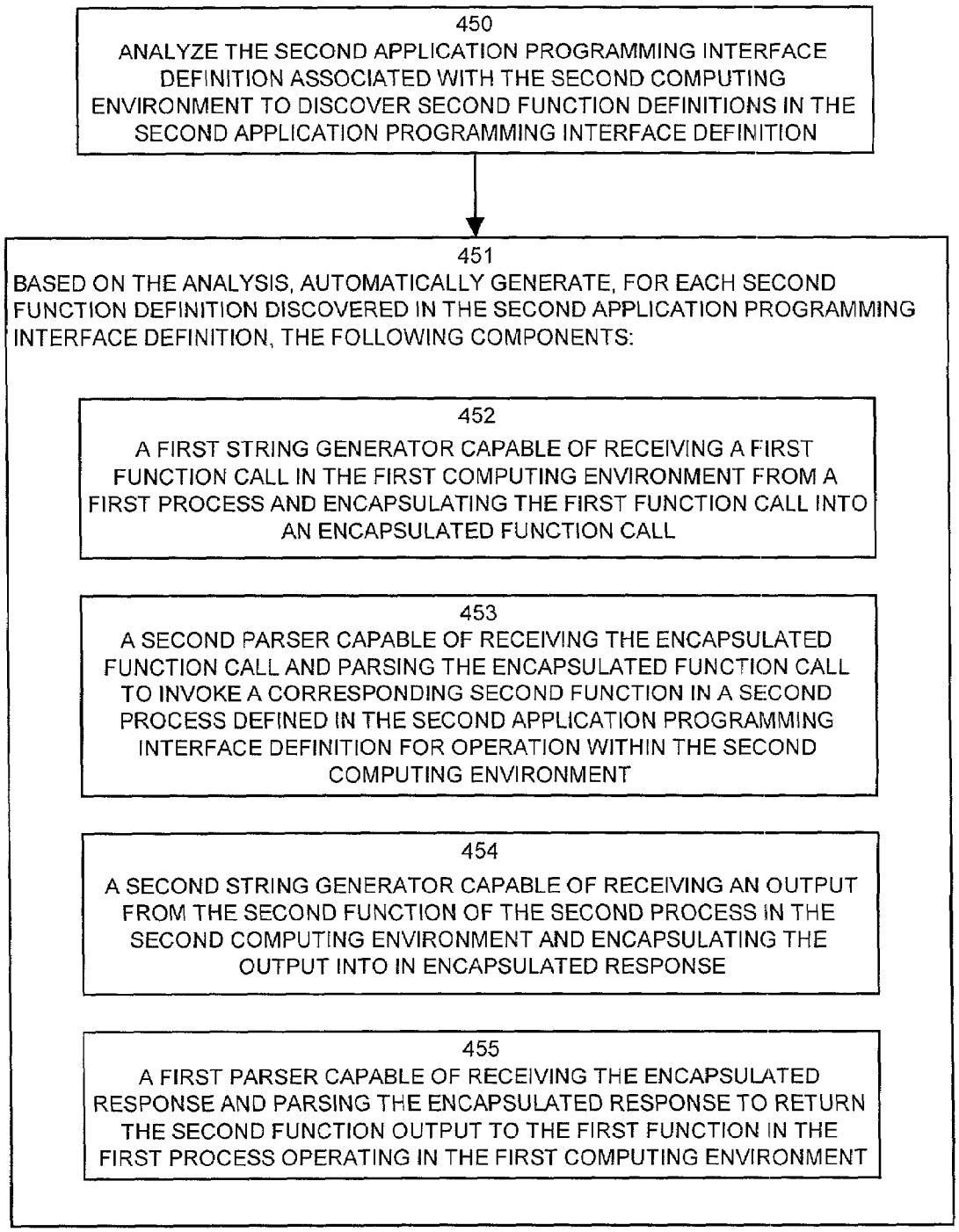
FIG. 10 is a flow chart of processing steps performed according to one embodiment of the invention to produce software components illustrated in FIG. 9.

FIG. 10 is a flow chart of processing steps performed according to one embodiment of the invention to produce the software components illustrated in the example API analysis environment 300 shown in FIG. 9.

In step 450, the grammar API processor 420 analyzes the second application programming interface definition 139 associated with the second computing environment (130, which is a C language application operating environment) to discover second function definitions in the second application programming interface definition 139 and produces parser output 418. As mentioned above, in the embodiment illustrated in FIG. 9, the functions and data structures file 415 indicates which particular second functions the grammar API processor 420 attempts to discover and process during analysis in step 450. The parser output 418 is then linked with the support code 410 to produce the application programming interface processor 418.

In step 451, based in the analysis in step 450, the grammar API processor 420 (now operating as 418) automatically generates, for each second function definition discovered in the application programming interface definition 139 (and, in this example, corresponding to those listed in the functions and data structures file 415), a number of software components 127, 137, 428, 422 and 129.

In step 452, the API processor 418 generates a first string generator 127 which, as explained above, is capable of receiving a first function call in the first computing environment 120 from a first process 126 and encapsulating the first function call into an encapsulated function call 153. In one embodiment of the invention, the first string generator 127 which is automatically generated in step 452 is created or generated upon detecting or discovering each second function call definition, as listed within the functions and data structures file 415. Upon discovering each second function call definition, the API processor 418 invokes the appropriate corresponding support code 410 to perform the processing steps illustrated in FIG. 11.

Figure 11:
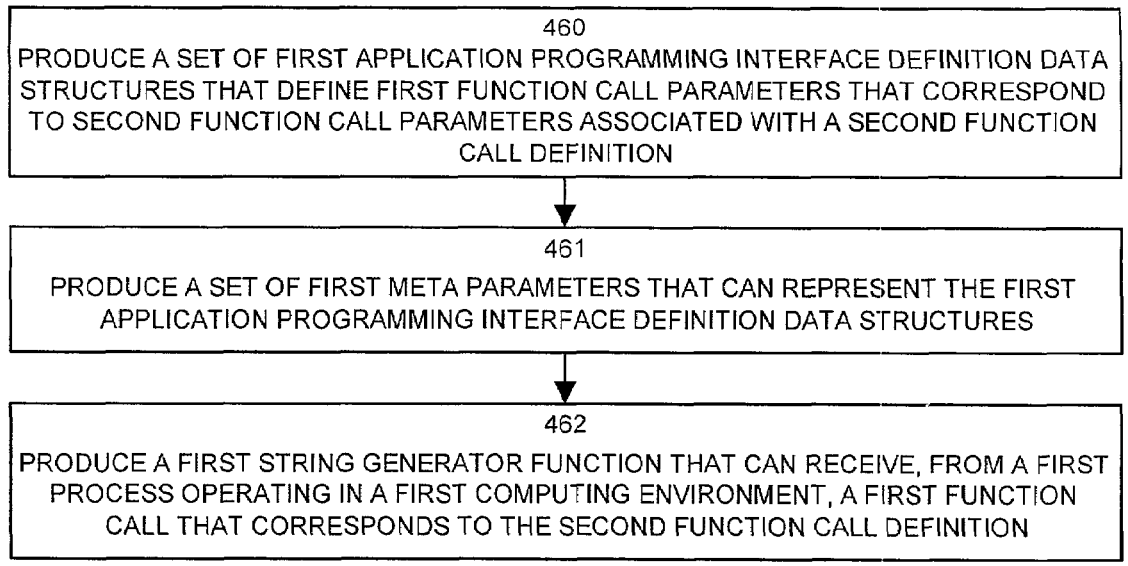
FIG. 11 is a flow chart of processing steps performed according to one embodiment of the invention to produce a first string generator.

FIG. 11 is a flow chart of example processing steps performed within step 452 in FIG. 10 according to one embodiment of the invention in order to generate a first string generator 127.

In step 460, the API processor 418 produces a set of first application programming interface definition data structures 129-2 that define first function call parameters that correspond to second function call parameters associated with the second function call definition. An example of this processing was discussed above.

Next, in step 461, the processor 418 produces a set of functions (e.g., 163) that can generate the set of first meta parameters 165 that can represent the first application programming interface definition data structures 129-2 when a function 161 gets called from the first process 126. In step 461 then, after having created a set of first application programming interface data definition structures 129-2 from the processing explained above with respect to step 460, the API processor 418 produces corresponding functions that can produce the set of first meta parameters 165 that can represent the first application programming interface data definition structures. In one embodiment of the invention, the first meta parameters (e.g., 164) represent alphanumeric character strings defined according to a data structure format usable within the first computing environment 120. As an example, if the first computing environment 120 is a Java-based software operation environment, then the first meta parameters 165 can be Java string parameters that map to first function call parameters 174 (FIG. 4) made by a Java function call to the first function by the first process 126.

In step 462, the API processor 418 produces a first string generator function (associated with the second function call definition 262 currently being processed) that can receive, from a first process 126 that can operate in the first computing environment 120, a first function call 161 (FIG. 3) that corresponds to the second function call definition 262. The first string generator function (e.g., 163 in FIG. 3) is capable of mapping the first function call parameters provided by the first function call to respective first meta parameters for encapsulation within an encapsulated function call 153 for transfer to the second computing environment 130 (i.e., during run-time). In other words, in step 462, the API processor 418 produces as output, and as part of the first API string generator 127, a function 163 that can receive the function call to the first function 161 within the first process 126 and that can map the first function call parameters to first meta parameters 164 as discussed above with respect to the example illustration in FIG. 3.

Returning attention now to the flow chart of processing steps in FIG. 10, in step 453, the API processor 418 also automatically generates a second parser 138 (i.e., which can operate at runtime as the second parser process). The second parser 138 produced in step 453 is capable of receiving an encapsulated function call 153 as previously explained with respect to FIG. 6. The second parser 138 produced in step 453 is also capable of parsing the encapsulated function call 153 to invoke a corresponding second function 261, 262 (FIG. 6) in a second process 136 defined in the second application programming interface definition 139 for operation within the second computing environment 130.

As illustrated in FIG. 9, production of the second parser process 138 involves the API processor 418 first producing a second API specific grammar 422 which defines the functions and data structures of the second functions and second data structures listed in the functions and data structures file 415 from the second application programming interface 139. In other words, the second API specific grammar 422 is a stripped down version of the second API interface definition 139 that only contains the second functions and data structures inferred from processing the second application programming interface definition 139 as explained above. This grammar 422 along with language grammar 405 are then processed by the API processor 420 in order to produce the second parser process 138 which converts meta parameters received within an encapsulated function call 153 into corresponding C-based second function call parameters usable by second function calls 262 defined within the second API definition 139.

Figure 12:
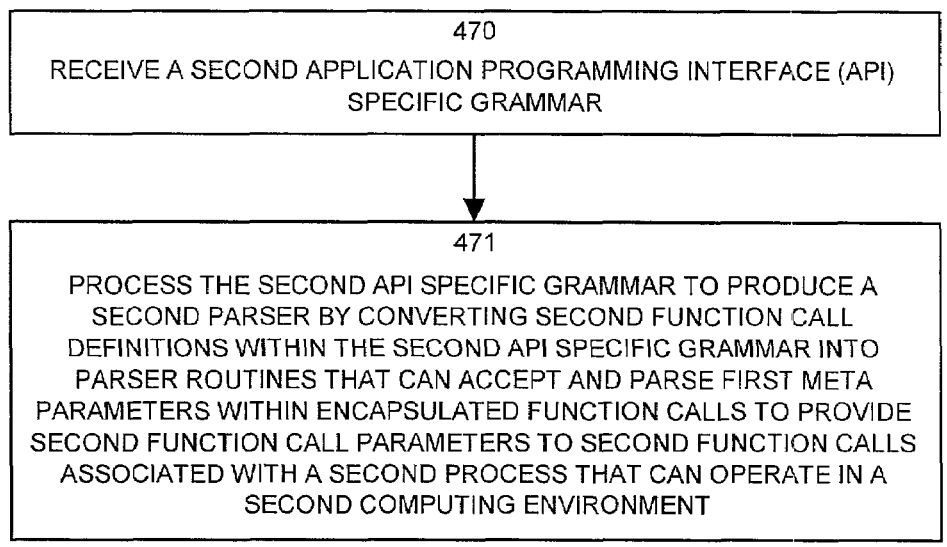
FIG. 12 is a flow chart of processing steps performed according to one embodiment of the invention to produce a second parser.

FIG. 12 illustrates a flow chart of processing steps performed within step 453 of FIG. 10 to produce the second parser 138 according to one embodiment of the invention.

In step 470, the API processor 418 receives the second application programming interface specific grammar 422 produced as a result of the step of analyzing the second application programming interface definition (i.e., step 450).

Next, in step 471, the API processor 418 processes the second application programming interface specific grammar 422 to produce the second parser 138 by converting second function call definitions 262 within the second application programming interface specific grammar 422 into parser routines (e.g., parse function call 273 in the example in FIG. 6) that can accept and parse first meta parameters 164 (FIG. 3) within encapsulated function calls 153 to provide second function call parameters 274 (FIG. 6) to second function calls 261 associated with a second process 136 that can operate in the second computing environment 130. In other words, in step 471, the API processor 418 produces a respective second parsing function for each second function call definition 262. The respective parsing function is capable of receiving an encapsulated function call 153 that contains meta parameters 164 associated with the second function call definition 262 and is capable of mapping or converting or copying the values of the first meta parameters 164 into second function call parameters 274 and then is capable of invoking the second function call 262 to operate the second function 261 within the second process 136 by providing the second function call 262 with the second function call parameters 274. This processing was explained above with respect to FIG. 6.

Returning attention now again to the flow chart of processing steps in FIG. 10, in step 454, the API processor 418 in FIG. 9 automatically generates a second string generator 137 capable of receiving an output of a second function 261 (as in the example in FIG. 7) of the second process 136 in the second computing environment 130 and encapsulating the output into an encapsulated response 154. An example of the processing capable of being performed by a second string generator 137 produced as a result of the processing of step 454 is shown in FIG. 7 and has previously been explained.

Figure 13:
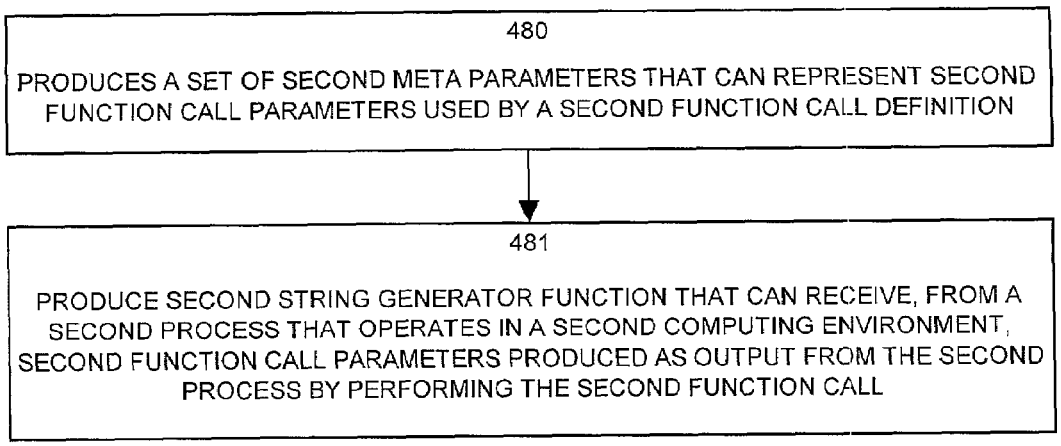
FIG. 13 is a flow chart of processing steps performed according to one embodiment of the invention to produce a second string generator.

FIG. 13 is a flow chart of processing steps which show the details of processing step 454 from FIG. 10 in order for the API processor 418 to produce a second string generator 137 according to one embodiment of the invention. The processing illustrated in FIG. 13 and representing step 454 in FIG. 10 is performed for each second function call definition 262 that the API processor 418 discovers within the second application programming interface 139 which are listed in the functions and data structures file 415.

In step 480, the API processor 418 produces a set of second meta parameters (e.g., 265 in FIG. 7) that can represent second function call parameters 274 (FIG. 6) used by the second function call definition 262. The second meta parameters are produced by accessing the second application programming interface definition data structures 139-2 defined in the second application programming interface definition 139, as listed or otherwise identified within the functions and data structures file 415. That is, as noted above, the functions and data structures file 415 indicates which data structures 275 are to be used to allow second function definitions 262 to be accessed by a first process 126 (via calls to corresponding first functions 162) operating in another computing environment 120. The second string generator 137 includes the ability to receive an output from a second function operation 261 within the second process 136 and to convert the second function call parameter values 274 into second meta parameters 264 for encapsulating within an encapsulated response 154. Accordingly, in step 480, the API processor 418 produces a set of second meta parameters 265 that represent or map to corresponding second function call parameters used by the second function call definitions 262.

Next, in step 481, the API processor 418 produces a second string generator function (e.g., the encapsulated response function 263 illustrated in FIG. 7) and that can receive, from the second process 136 that operates in the second computing environment 130, the second function call parameters 274 produced as output from the second process 136 by performing the second function call 262. The second string generator function 263 (e.g., ENCAPSULATE RESPONSE in FIG. 7) is capable of mapping the second function call parameters 274 provided from invocation of the second function call 262 into second meta parameters 264 for encapsulation within an encapsulated response 154 for transfer back to the first computing environment 120. In this manner, the encapsulated response function code 263 is generated to allow return results from the second function 261 to be sent back to the first process 126 via an encapsulated response 154.

Returning attention once again to the flow chart of processing steps in FIG. 10, step 455 is performed by the API processor 418 to automatically generate the first parser 128 which is capable, when operating as a process, of receiving an encapsulated response 154 and parsing the encapsulated response 154 to return second function output 192 to the first function 161 originally called from the first process 126 operating in the first computing environment 120. As discussed in detail above with respect to FIG. 4, the first parser process 128 is capable of receiving the encapsulated response 154 and mapping the second meta parameters 264 back into first function call parameters 174 for return to the first process 126.

Figure 14:
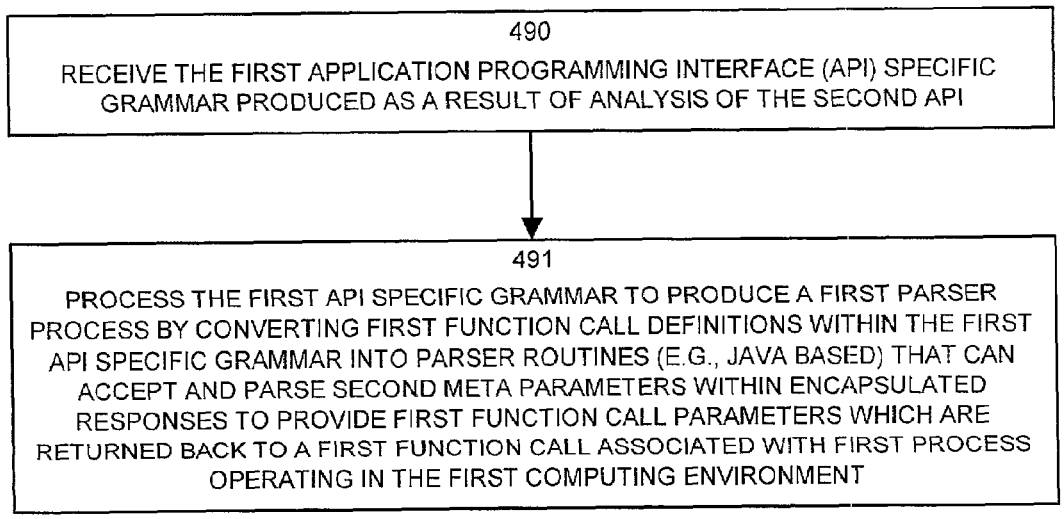
FIG. 14 is a flow chart of processing steps performed according to one embodiment of the invention to produce a first parser.

FIG. 14 is a flow chart of processing steps which show the details of processing related to step 455 in the flow chart in FIG. 10 in order to produce the code that, when executed, provides the first parser process 128 according to one embodiment of the invention. It is noted that the conversion of the first API specific grammar 428 illustrated in FIG. 9 into the first parser process 128 is not performed in this example embodiment by the API processor 418. Instead, a program referred to herein as a secondary API processor 430 is used for this purpose.

Recall from the aforementioned explanation that the first computing environment is a Java-based computing environment in one embodiment of the invention. As such, the first API specific grammar 428 defines or contains Java specific data structures 129-2 and function call definitions 129-1 produced when the API processor 418 detects a second function definition 262 within the second API definition 139. In other words, during analysis of the second API definition 139, support code for second functions can produce the appropriate text for the first API specific grammar 428 which may be a file formatted according to a Java specific API grammar. Accordingly, instead of using a C-based grammar API processor 420, this example embodiment of the invention uses a secondary API processor 430 which is a Java-based grammar processor. An example of such a secondary application programming interface processor 230 is the ANTLR Java-based grammar processor produced by a company called jGuru and the software is available at www.antlr.org. The secondary API processor 430 can produce Java code based upon the analysis of the first API specific grammar 428. Specifically, the secondary API processor 430 can produce the Java code for the first parser process 128.

In step 490, the secondary API processor 430 receives the first application programming interface specific grammar 428 produced as a result of the step 450 (FIG. 10) which performed the analysis of the second application programming interface definition 139.

Next, in step 491, the secondary API processor 430 processes the first application programming interface specific grammar 428 to produce the first parser process 128 (i.e., to produce the code that when executed provides the first parser process) by converting first function call definitions defined within the first application programming interface specific grammar 428 into Java-based parser routines 173 (as in the example in FIG. 4). The parser routines 173 can accept and parse meta parameters (specifically, second meta parameters as in the example illustrated in FIG. 4) within encapsulated responses 154 to provide first function call parameters 174 which are returned back to the first function call 161 associated with the first process 126 that operates in the first computing environment 120. In other words, in step 491, the secondary API processor 430 can detect function call definitions within the first API specific grammar 428 and can produce parsing functions 173 that are capable of converting second meta parameters 264 into first function call parameters 174 associated with each of these function call definitions.

In this manner, as explained above with respect to the example in FIG. 4, the first parser process 127 is able to parse encapsulated responses 154 and return results to the function calls 161 made by the first process 126. This allows the first process 126 access to second function call definitions 262 defined within the second application programming interface definition 139 operating within the second computing environment 130.

Using the aforementioned processing techniques, the embodiments of the invention illustrated with respect to FIG. 9 and with the flow chart of processing steps in FIG. 10 are capable of performing an analysis on an application programming interface definition written, for example, in the C programming language and are capable of producing string generators and parser processes which allow encapsulated function calls 153 to be transferred from one computing environment to another at which point those function calls are processed using a second API which is otherwise unavailable to the first computing environment (i.e., to the first process initially making the function call to the first API). Thereafter, when the function call is processed in the other computing environment, a string generator process can operate to encapsulate return values into an encapsulated response 154 for return to the original computing environment which operates the first process which initially made the first function call. Since meta parameters are used to represent function call parameter values passed between the two computing system operating environments, incompatibility differences associated with the way in which function calls are actually invoked are insulated from one computing environment to the other. This allows a computing environment such as Java to allow Java processes to invoke C functions provided by a C application programming interface operating in another computing system.

Those skilled in the art will understand that there can be many other variations made to the operations of the embodiments explained above while still achieving the same objectives of the invention. Such variations are intended to be covered by the scope of this invention. As such, the foregoing description of embodiments of the invention is not intended to be limiting. Rather, any limitations to embodiments of the invention are presented in the following claims.

What is claimed is:

1. A computer-implemented method for accessing a second application programming interface in a second computing environment from a first process operating in a first computing environment that cannot natively access the second application programming interface, the method comprising the steps of:

detecting a first function call made by the first process, the first function call including a first function call parameter, the first function call and the first function call parameter not being usable as generated by the first process to access the second application programming interface;

accessing a first application programming interface definition defining (i) a mapping of the first function call and the first function call parameter to corresponding meta parameters, a first meta parameter being an intermediate representation of the first function call and being mapped to a second function call usable to access the second application programming interface, and a second meta parameter being an intermediate representation of the first function call parameter and being mapped to a second function call parameter usable with the second function call to access the second application programming interface;

generating an encapsulated function call containing the meta parameters; and sending the encapsulated function call from the first computing environment destined for the second computing environment.

2. The method of claim 1 further including the steps of:

receiving an encapsulated response from the second computing environment, the encapsulated response containing second meta parameter values produced in the second computing environment from performance of at least one second function call in the second application programming interface that corresponds to the first function call detected in the first computing environment;

parsing the encapsulated response to map the second meta parameter values back to the first function call parameters usable by the first process in the first computing environment.

3. The method of claim 2 wherein the step of parsing the encapsulated response comprises the steps of:

parsing the encapsulated response to detect second meta parameters;

for each of the second meta parameters detected:

selecting a respective first application programming interface definition data structure in the first application programming interface that can represent the second meta parameter as a first function call parameter; and copying second meta parameter values into the respective first application programming interface definition data structure to produce a first function call parameter that contains the value of the second meta parameter.

4. The method of claim 3 wherein at least one second meta parameter in the encapsulated response identifies a first function call definition within the first application programming interface definition, the first function call definition indicating the respective first application programming interface definition data structures that can accept the copied second meta parameter values.

5. The method of claim 3 wherein the second meta parameter values represent values of parameters processed by second function calls in the second application programming interface in the second computing environment and wherein the first application programming interface definition data structures that accept the copied second meta parameter values are natively incompatible for use in the second computing environment.

6. The method of claim 5 wherein the first application programming interface definition data structures in the first application programming interface are defined in a Java-based format useable by Java-based first processes and wherein the second function calls that operate to produce the second meta parameter values in the second application programming interface are defined in a C-based format useable by C-based second processes operating in the second programming environment.

7. The method of claim 1 wherein the step of detecting a first function call in the first computing environment comprises the steps of:
  accessing a first application programming interface definition defining first function calls useable by first processes operating in the first computing environment, the first function calls corresponding to at least one second function call defined in a second application programming interface useable by second processes in the second computing environment.

8. The method of claim 7 wherein the first function calls in the first application programming interface are defined in a Java-based format useable by Java-based first processes and wherein the second function calls in the second application programming interface are defined in a C-based format useable by C-based second processes.

9. The method of claim 7 further comprising the step of automatically deriving the first application programming interface definition from an analysis of the second application programming interface definition.

10. The method of claim 7 wherein the step of generating an encapsulated function call comprises the steps of:
  extracting the first function call parameters from the first function call using the first application programming interface; and
  for each of the first function call parameters:
    selecting a respective first application programming interface definition data structure in the first application programming interface that can represent the first function parameter as a first meta parameter; and
    copying the first function call parameter into the respective first application programming interface definition data structure to produce a first meta parameter that contains the value of the first function call parameter.

11. The method of claim 10 wherein the first meta parameters contain strings that represent values of the first function call parameters.

12. A computer system, comprising:
  an interface;
  a memory;
  a processor; and
  an interconnection mechanism coupling the interface, the processor and the memory;
  wherein the memory is encoded with a first application programming interface string generator application and a first parser application that, when performed on the processor, produce a respective first application programming interface string generator process and first parser process that cause the computer system to access a second application programming interface in a second computing environment by a first process operating in the computer system by causing the computer system to perform the operations of:
    detecting a first function call made by the first process, the first function call including a first function call parameter, the first function call and the first function call parameter not being usable as generated by the first process to access the second application programming interface;
    accessing a first application programming interface definition defining (i) a mapping of the first function call and the first function call parameter to corresponding meta parameters, a first meta parameter being an intermediate representation of the first function call and being mapped to a second function call usable to access the second application programming interface, and a second meta parameter being an intermediate representation of the first function call parameter and being mapped to a second function call parameter usable with the second function call to access the second application programming interface;
    generating an encapsulated function call containing the meta parameters; and
    sending the encapsulated function call from the first computing environment destined for the second computing environment.

13. The computer system of claim 12 wherein the first parser process further causes the computer system to perform the operations of:
  receiving an encapsulated response from the second computing environment, the encapsulated response containing second meta parameter values produced in the second computing environment from performance of at least one second function call in the second application programming interface that corresponds to the first function call detected in the first computing environment;
  parsing the encapsulated response to map the second meta parameter values back to the first function call parameters usable by the first process in the first computing environment.

14. The computer system of claim 13 wherein when the computer system performs the operation of parsing the encapsulated response, the computer system performs the operations of:
  parsing the encapsulated response to detect second meta parameters;
  for each of the second meta parameters detected:
    selecting a respective first application programming interface definition data structure in the first application programming interface that can represent the second meta parameter as a first function call parameter; and
    copying second meta parameter values into the respective first application programming interface definition data structure to produce a first function call parameter that contains the value of the second meta parameter.

15. The computer system of claim 14 wherein at least one second meta parameter in the encapsulated response identifies a first function call definition within the first application programming interface definition, the first function call definition indicating the respective first application programming interface definition data structures that can accept the copied second meta parameter values.

16. The computer system of claim 14 wherein the second meta parameter values represent values of parameters processed by second function calls in the second application programming interface in the second computing environment and wherein the first application programming interface definition data structures that accept the copied second meta parameter values are natively incompatible for use in the second computing environment.

17. The computer system of claim 16 wherein the first application programming interface definition data structures in the first application programming interface are defined in a Java-based format useable by Java-based first processes and wherein the second function calls that operate to produce the second meta parameter values in the second application programming interface are defined in a C-based format useable by C-based second processes operating in the second programming environment.

18. The computer system of claim 12 wherein when the computer system performs the operation of detecting a first function call in the first computing environment, the computer system further performs the operation of:

accessing a first application programming interface definition defining first function calls useable by first processes operating in the first computing environment, the first function calls corresponding to at least one second function call defined in a second application programming interface useable by second processes in the second computing environment.

19. The computer system of claim 18 wherein the first function calls in the first application programming interface are defined in a Java-based format useable by Java-based first processes and wherein the second function calls in the second application programming interface are defined in a C-based format useable by C-based second processes.

20. The computer system of claim 18 wherein the memory is encoded with a grammar application programming interface processor that when operated on the processor further causes the computer system to perform an operation of automatically deriving the first application programming interface definition from an analysis of the second application programming interface definition.

21. The computer system of claim 18 wherein when the computer system performs the operation of generating an encapsulated function call, the computer system performs the operations of:

extracting the first function call parameters from the first function call using the first application programming interface; and for each of the first function call parameters:

selecting a respective first application programming interface definition data structure in the first application programming interface that can represent the first function parameter as a first meta parameter; and copying the first function call parameter into the respective first application programming interface definition data structure to produce a first meta parameter that contains the value of the first function call parameter.

22. The computer system of claim 21 wherein the first meta parameters contain strings that represent values of the first function call parameters.

23. A computer system, comprising:
an interface;
a memory;
a processor; and
an interconnection mechanism coupling the interface, the processor and the memory;

wherein the memory is encoded with logic instructions that, when executed on the processor in the computer system, provide the computer system with:

means for detecting a first function call made by the first process, the first function call including a first function call parameter, the first function call and the first function call parameter not being usable as generated by the first process to access the second application programming interface;

means for accessing a first application programming interface definition defining (i) a mapping of the first function call and the first function call parameter to corresponding meta parameters, a first meta parameter being an intermediate representation of the first function call and being mapped to a second function call usable to access the second application programming interface, and a second meta parameter being an intermediate representation of the first function call parameter and being mapped to a second function call parameter usable with the second function call to access the second application programming interface;

means for generating an encapsulated function call containing the meta parameters; and means for sending the encapsulated function call from the first computing environment destined for the second computing environment.

24. A computer program product having a computer-readable medium including computer program logic encoded thereon, that when executed on a computer system having a coupling of a memory and a processor, provides a method for accessing a second application programming interface in a second computing environment from a first process operating in a first computing environment that cannot natively access the second application programming interface by causing the processor to perform the operations of:

detecting a first function call made by the first process, the first function call including a first function call parameter, the first function call and the first function call parameter not being usable as generated by the first process to access the second application programming interface;

accessing a first application programming interface definition defining (i) a mapping of the first function call and the first function call parameter to corresponding meta parameters, a first meta parameter being an intermediate representation of the first function call and being mapped to a second function call usable to access the second application programming interface, and a second meta parameter being an intermediate representation of the first function call parameter and being mapped to a second function call parameter usable with the second function call to access the second application programming interface;

generating an encapsulated function call containing the meta parameters; and sending the encapsulated function call from the first computing environment destined for the second computing environment.

* * * * *